US 11,933,884 B2

United States Patent
Toriya et al.

(10) Patent No.: US 11,933,884 B2
(45) Date of Patent: Mar. 19, 2024

(54) RADAR IMAGE PROCESSING DEVICE, RADAR IMAGE PROCESSING METHOD, AND STORAGE MEDIUM

(71) Applicant: NEC CORPORATION, Tokyo (JP)

(72) Inventors: Hisatoshi Toriya, Tokyo (JP); Masato Toda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 798 days.

(21) Appl. No.: 17/040,785

(22) PCT Filed: Mar. 18, 2019

(86) PCT No.: PCT/JP2019/011209
§ 371 (c)(1),
(2) Date: Sep. 23, 2020

(87) PCT Pub. No.: WO2019/188509
PCT Pub. Date: Oct. 3, 2019

(65) Prior Publication Data
US 2021/0003698 A1    Jan. 7, 2021

(30) Foreign Application Priority Data
Mar. 26, 2018 (JP) .................................. 2018-057972

(51) Int. Cl.
*G01S 13/90* (2006.01)
*G06T 5/00* (2006.01)
(Continued)

(52) U.S. Cl.
CPC ...... *G01S 13/9027* (2019.05); *G01S 13/9021* (2019.05); *G06T 5/002* (2013.01);
(Continued)

(58) Field of Classification Search
None
See application file for complete search history.

(56) References Cited

U.S. PATENT DOCUMENTS

2018/0059238 A1*  3/2018  Stevens .............. G01S 13/9027

FOREIGN PATENT DOCUMENTS

CN     104867120 A    8/2015
JP     2006-029979 A  2/2006
(Continued)

OTHER PUBLICATIONS

S. Parrilli, et al."A nonlocal SAR image denoising algorithm based on LLMMSE wavelet shrinkage", IEEE Transactions on Geoscience and Remote Sensing, vol. 50, No. 2, Feb. 2012, pp. 606-616.
(Continued)

*Primary Examiner* — Whitney Moore
(74) *Attorney, Agent, or Firm* — Sughrue Mion, PLLC

(57) ABSTRACT

A radar image processing device includes at least one memory configured to store instructions; and at least one processor configured to execute the instructions to: determine a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar; extract a similar block that is similar to the reference block and included in the search range by searching the search range; and perform filtering processing for reducing speckles generated in the radar image by using the reference block and the extracted similar block.

17 Claims, 18 Drawing Sheets

(51) Int. Cl.
*G06T 5/20* (2006.01)
*G06V 10/25* (2022.01)
*G06V 10/75* (2022.01)
*G06V 20/13* (2022.01)

(52) U.S. Cl.
CPC ............... *G06T 5/20* (2013.01); *G06V 10/25* (2022.01); *G06V 20/13* (2022.01); *G06T 2207/10044* (2013.01); *G06V 10/759* (2022.01)

(56) References Cited

FOREIGN PATENT DOCUMENTS

| | | | | |
|---|---|---|---|---|
| JP | 2013-130573 A | 7/2013 | | |
| WO | WO-2015008310 A1 * | 1/2015 | ......... | G01S 13/9023 |

OTHER PUBLICATIONS

Kostadin Dabov, et al., "Image denoising by sparse 3D transform-domain collaborative filtering", IEEE Trans. Image Process., Aug. 2007, vol. 16, No. 8, pp. 2080-2095.

G. Chierchia, et al. "Multitemporal SAR Image Despeckling Based on Block-Matching and Collaborative Filtering", IEEE Transactions on Geoscience and Remote Sensing [online], vol. 55, No. 10, Sep. 25, 2017, pp. 5467-5480, DOI:10.1109/TGRS.2017.2707806 §I, §II.B, §III.A, §IV.A-§IV.B, fig. 2.

G. Poggi, et al., "Non-Local Methods for Filtering Interferometric SAR Datasets", Proceedings of the 2012 Tyrrhenian Workshop on Advances in Radar and Remote Sensing (TYWRRS) [online], Dec. 13, 2012, 4 pages, DOI:10.1109/TyWRRS.2012.6381118 fig. 2.

International Search Report for PCT/JP2019/011209 dated Jun. 4, 2019 [PCT/ISA/210].

Written Opinion for PCT/JP2019/011209 dated Jun. 4, 2019 [PCT/ISA/237].

* cited by examiner

← LAYOVER DIRECTION

← LAYOVER DIRECTION

NEAREST POINT   FARTHEST POINT

RADAR IMAGE PROCESSING DEVICE, RADAR IMAGE PROCESSING METHOD, AND STORAGE MEDIUM

CROSS REFERENCE TO RELATED APPLICATIONS

This application is a National Stage of International Application No. PCT/JP2019/011209 filed Mar. 18, 2019, claiming priority based on Japanese Patent Application No. 2018-057972 filed Mar. 26, 2019, the entire disclosure of which is incorporated herein

TECHNICAL FIELD

The present disclosure relates to a technique for processing a radar image generated from data obtained by an imaging radar.

BACKGROUND ART

A synthetic aperture radar (SAR) is a radar used for active sensing for imaging of the ground surface and structures (including objects on the ground surface, such as trees, buildings, and houses). In measurement using the SAR, information such as positions, shapes, and scattering characteristics of the ground surface and structures are obtained by emitting an electromagnetic wave (specifically, for example, a radio wave having a wavelength of equal to or more than 100 µm) toward a target object to measure the intensity of the electromagnetic wave that hits the object and returns as a reflected wave due to scattering and a time period for the emitted electromagnetic wave to return from the object. The measurement using the SAR enables night-time sensing, which is difficult with a visible light sensor, and sensing not affected by the presence of clouds.

Generally, an image in which a complex amplitude of the received electromagnetic wave is represented in two dimensions is called a SAR image. The SAR image is, in other words, an image representing an intensity distribution of reflected waves. The SAR image tends to include multiplicative noise called "speckle noise" (or just "speckle"). The speckle impedes human or computer analysis (identification of an object, and the like) of the SAR image.

NPL 1 proposes "SAR-BM3D" as a technique for reducing speckles in a SAR image. The SAR-BM3D is a technique in which noise reduction processing called block matching 3D (BM3D) is applied to reduce speckles in a SAR image. The BM3D (for example, disclosed in NPL 2) is a kind of noise reduction processing using a filter called a nonlocal means filter, and is mainly intended to be applied to an optical image in which additive white Gaussian noise occurs.

The SAR-BM3D includes steps of setting a reference block, searching for and detecting a similar block similar to the reference block, and determining a correction value in filtering using the reference block and the detected similar block. In the SAR-BM3D, the more similar blocks detected, the better filtering performance can be expected.

Both PTLs 1 and 2 disclose the technique for reducing speckles.

CITATION LIST

Patent Literature

[PTL 1] JP 2006-029979 A
[PTL 2] JP 2013-130573 A

Non Patent Literature

[NPL 1] S. Parrilli, M. Poderico, C. V. Angelino, L. Verdoliva, "A nonlocal SAR image denoising algorithm based on LLMMSE wavelet shrinkage", IEEE Transactions on Geoscience and Remote Sensing, vol. 50, no. 2, February 2012, pp. 606-616.
[NPL 2] K. Dabov, A. Foi, V. Katkovnik, and K. Egiazarian, "Image denoising by sparse 3D transform-domain collaborative filtering", IEEE Trans. Image Process., vol. 16, no. 8, August 2007, pp. 2080-2095.

SUMMARY OF INVENTION

Technical Problem

In the detection of a similar block in the SAR-BM3D, the wider a search range is, the more similar blocks may be detected, but the greater the amount of calculation is.

A search range generally employed is a square range centered on a reference block. However, the square range centered on the reference block is not necessarily an optimum search range. When a range in which a similar block is difficult to be detected is included in the search range, filtering performance relative to a calculation cost becomes low. A method for solving such a problem related to efficiency in searching for a similar block is not disclosed in any of the above-mentioned documents.

One of objects of the present disclosure is to provide a radar image processing device, a radar image processing method, a radar image processing program, and the like, in which a similar block is efficiently extracted and performance of speckle reduction processing relative to a calculation cost is improved.

Solution to Problem

A radar image processing device according to one aspect of the present disclosure includes: search range determination means for determining a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar; extraction means for extracting a similar block that is similar to the reference block and included in the search range by searching the search range; and filtering processing means for performing filtering processing for reducing speckles generated in the radar image by using the reference block and the extracted similar block.

A radar image processing method according to one aspect of the present disclosure includes: determining a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar; extracting a similar block that is similar to the reference block and included in the search range by searching the search range; and performing filtering processing for reducing speckles generated in the radar image by using the reference block and the extracted similar block.

A program according to one aspect of the present disclosure causes a computer to execute: search range determination processing for determining a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar; extraction processing for extracting a similar block that is similar to the reference block and included in the search range by searching the search range; and filtering processing for reducing speckles generated in the radar image by using the reference block and the extracted similar block. The program can be stored on a non-temporary computer readable storage medium.

Advantageous Effects of Invention

According to the present disclosure, a similar block is efficiently extracted, and performance of speckle reduction processing is improved or a calculation cost is reduced.

EXAMPLE EMBODIMENT

Hereinafter, example embodiments of the present disclosure will be described in detail with reference to the drawings.

First Example Embodiment

First, a first example embodiment of the present disclosure will be described.

The first example embodiment is an example embodiment in which a radar image processing device 11 that performs image processing on a radar image is used. In the following description, a SAR image is exemplified as the radar image to be subjected to the image processing. However, the radar image to be subjected to the image processing may be a radar image acquired by an imaging radar other than a SAR (for example, a real aperture radar (RAR) image acquired by a RAR).

<Configuration>

Figure 1:
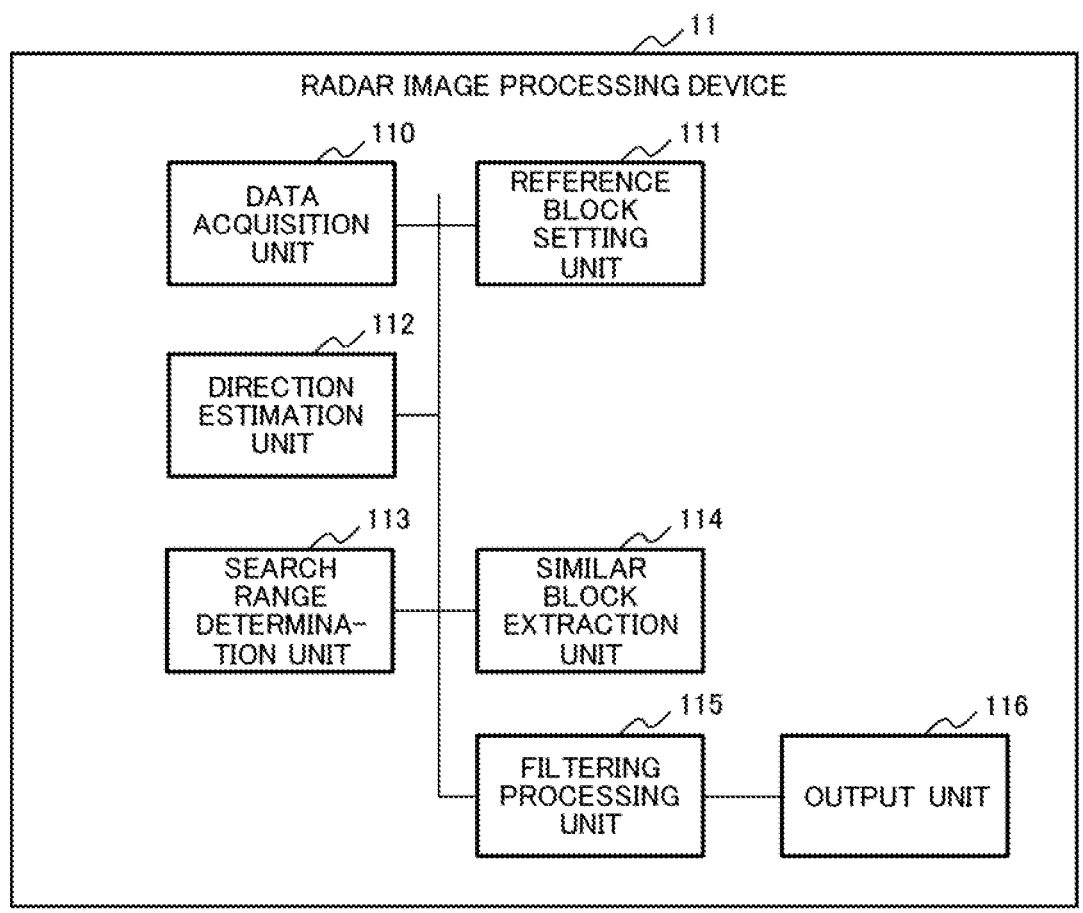
FIG. 1 is a block diagram illustrating a configuration of a radar image processing device according to a first example embodiment of the present disclosure.

FIG. 1 is a block diagram illustrating a configuration of the radar image processing device 11 according to the first example embodiment. The radar image processing device 11 includes a data acquisition unit 110, a reference block setting unit 111, a direction estimation unit 112, a search range determination unit 113, a similar block extraction unit 114, a filtering processing unit 115, and an output unit 116. The radar image processing device 11 may include an interface for receiving input of information such as instructions and data from an external device or a person.

Hereinafter, functions of components in the radar image processing device 11 will be described. As will be described later, each component in the radar image processing device 11 can be implemented by, for example, a computer including one or more processors that execute instructions on the basis of a program and a memory.

When generating or acquiring data, each component in the radar image processing device 11 can make the data available to another component. For example, each component can send the generated or acquired data to another component that uses the data. Alternatively, each component may record the generated or acquired data in a storage area (such as a memory, not illustrated) in the radar image processing device 11. When executing each processing, each component of the radar image processing device 11 may receive data to be used directly from a component that has generated or acquired the data or may read the data from the storage area.

Lines connecting the components illustrated in FIG. 1 indicate that data can be exchanged between the components. It is not necessarily required that the components be connected by signal lines similar to the lines illustrated in FIG. 1.

===Data Acquisition Unit 110===

The data acquisition unit 110 acquires SAR image data. For example, the data acquisition unit 110 can acquire SAR image data from a storage medium that stores the SAR image data. The data acquisition unit 110 may directly receive SAR image data from a device that performs measurement using a SAR to generate measurement data.

The data acquisition unit 110 further receives information regarding the incident direction of an electromagnetic wave at the time of measurement by the SAR. More specifically, the information regarding the incident direction of an electromagnetic wave is, for example, information representing an azimuth angle (angle relative to a reference azimuth (for example, north)) and a dip (angle relative to the horizontal direction). The data acquisition unit 110 may acquire the information regarding the incident direction of an electromagnetic wave as one of SAR image metadata. The data acquisition unit 110 may acquire the information regarding the incident direction of an electromagnetic wave from information input from the outside separately from the SAR image data.

===Reference Block Setting Unit 111===

The reference block setting unit 111 sets a reference block from a SAR image. The reference block is a small area in the SAR image. The size and the shape of the reference block are not limited to a specific size and shape. The size and the shape may be determined on the basis of input instructions. The size and the shape may be uniform across all reference blocks or may be different for each reference block.

The reference block setting unit 111 can set any small area in the SAR image as the reference block. As an example, the reference block setting unit 111 may select any pixel in the SAR image as a pixel of interest, and set a rectangle centered on the pixel of interest as the reference block.

The reference block setting unit 111 can set a plurality of reference blocks. The reference block setting unit 111 may be designed to extract the reference blocks at regular intervals, or may be designed to set, as the reference blocks, rectangles each centered on one of a plurality of randomly selected pixels of interest.

===Direction Estimation Unit 112===

The direction estimation unit 112 estimates the direction of layover on the basis of information regarding the incident direction of an electromagnetic wave received from the data acquisition unit 110.

An operation of the direction estimation unit 112 will be described in detail with reference to FIG. 2.

Layover means overlap of images in a SAR image. The layover particularly tends to occur when a structure rising from the ground surface, such as a building or a tower, is measured.

A mechanism by which the layover occurs will be described in detail with reference to FIG. 2. In FIG. 2, a measurement device $S_0$ that performs measurement by a SAR and a structure M existing in a measurement range are illustrated. Examples of the measurement device $S_0$ include an artificial satellite, an aircraft, a helicopter, or other flying object, on which a radar is mounted. While moving in the sky, the measurement device $S_0$ emits electromagnetic waves by the radar and receives the reflected electromagnetic waves. In FIG. 2, an arrow indicates the traveling direction of the measurement device $S_0$, that is, the traveling direction of the radar (also referred to as the azimuth direction). The electromagnetic waves emitted from the measurement device $S_0$ are reflected by the ground and the structure M on the ground by backscattering, and a part of the reflected waves are returned to the radar to be received. As a result, the distance between the position of the measurement device $S_0$ and a reflection point of the electromagnetic wave on the structure M is specified.

Figure 2:
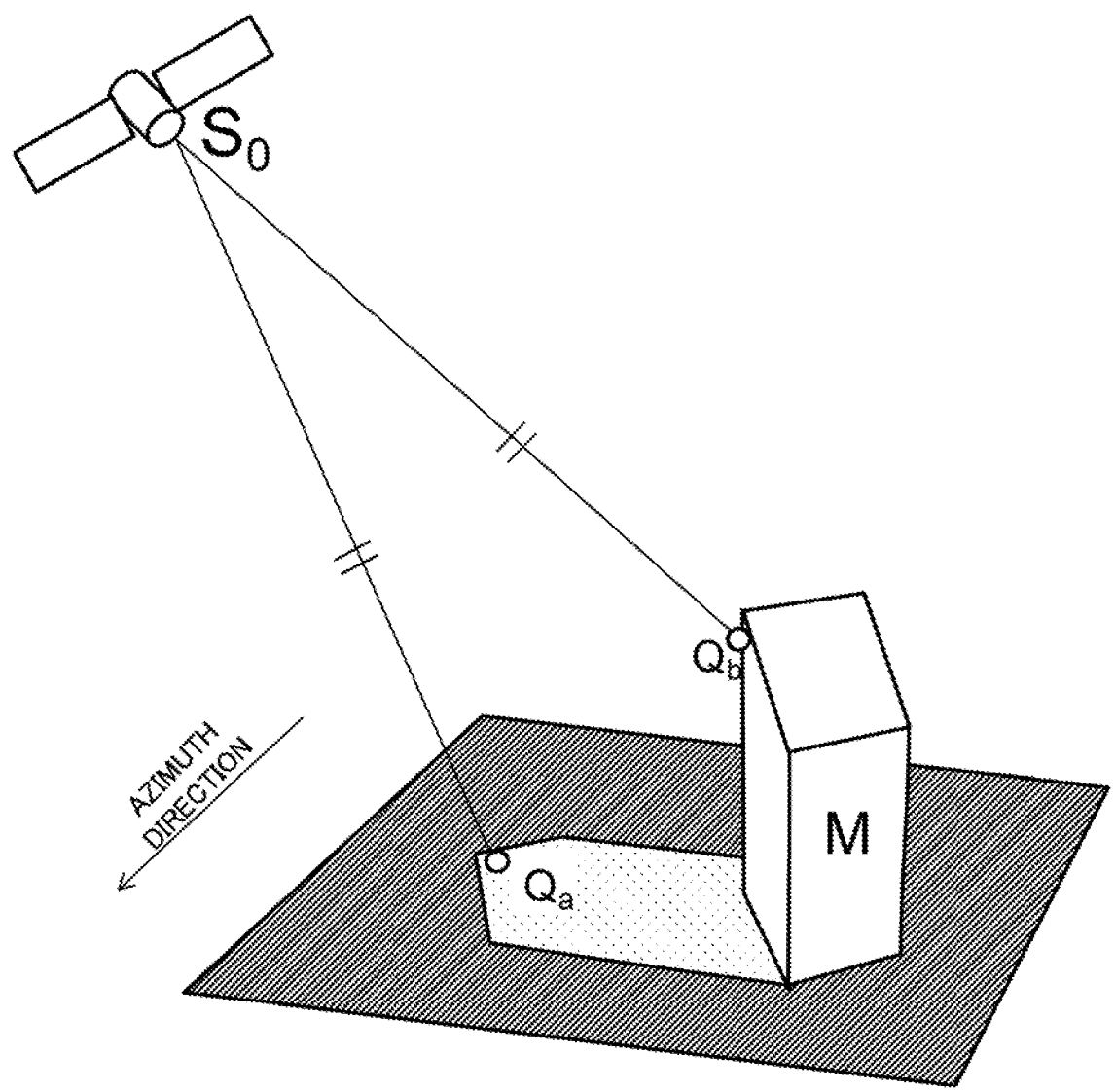
FIG. 2 is a diagram for describing layover.

In FIG. 2, a point $Q_a$ is a point on the ground, and a point $Q_b$ is a point on the surface of the structure M and away from the ground. It is assumed that the distance between the measurement device $S_0$ and the point $Q_a$ is equal to the distance between the measurement device $S_0$ and the point $Q_b$. A straight line connecting the point $Q_b$ and the point $Q_a$ and the traveling direction of the radar are perpendicular to each other. In such a case, the measurement device $S_0$ cannot distinguish a reflected wave at the point $Q_a$ from a reflected wave at the point $Q_b$. That is, the intensity of the reflected wave from the point $Q_a$ and the intensity of the reflected wave from the point $Q_b$ are measured in a mixed state.

Figure 3:
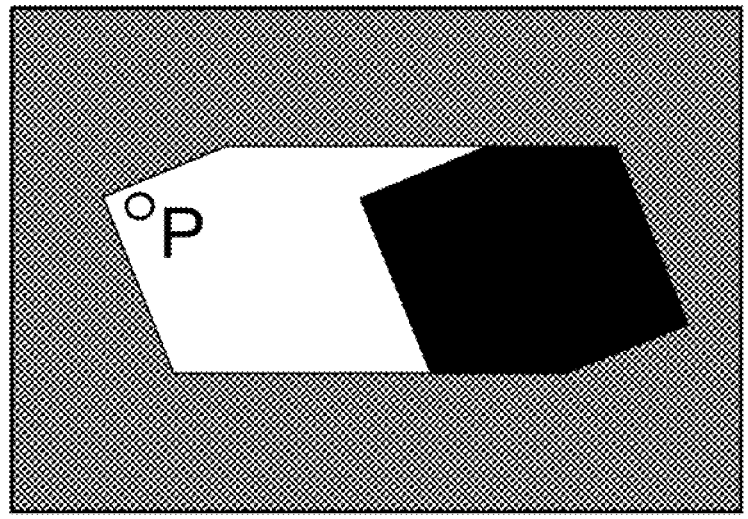
FIG. 3 is a diagram illustrating a schematic example of a SAR image in which layover occurs.

A schematic example of a SAR image generated in such a case is illustrated in FIG. 3. In FIG. 3, the downward direction is a direction corresponding to the azimuth direction (direction in which signals from points of equal altitude arranged in the azimuth direction are arranged). In FIG. 3, the right direction is a direction corresponding to the incident direction of an electromagnetic wave incident from a SAR satellite (when the incident direction is projected on the SAR image, the incident direction after the projection). The SAR image is generated on the basis of the intensity of a reflected wave received by a radar and the distance between a point where the reflected wave was emitted and the radar. It is assumed that resolution in the traveling direction of the radar is sufficient (that is, signals from two different points arranged in the azimuth direction can be distinguished from each other as signals from two different points with sufficient accuracy). However, as described above, reflected waves from equal to or more than two points having the same distance from the radar, which are on a plane including the position of the radar and perpendicular to the azimuth direction, are not distinguished. A point P reflects the intensity of the reflected wave from the point $Q_a$, and the intensity indicated at this point P also reflects the intensity of the reflected wave from the point $Q_b$. Layover is a phenomenon in which the intensities of reflected waves from equal to or more than two points overlap at one point in a SAR image in this way. In FIG. 3, a white area including the point P is an area where layover occurs.

In FIG. 3, an area painted black represents an area hidden from the radar by the structure M. This area is also called a radar shadow.

Figure 4:
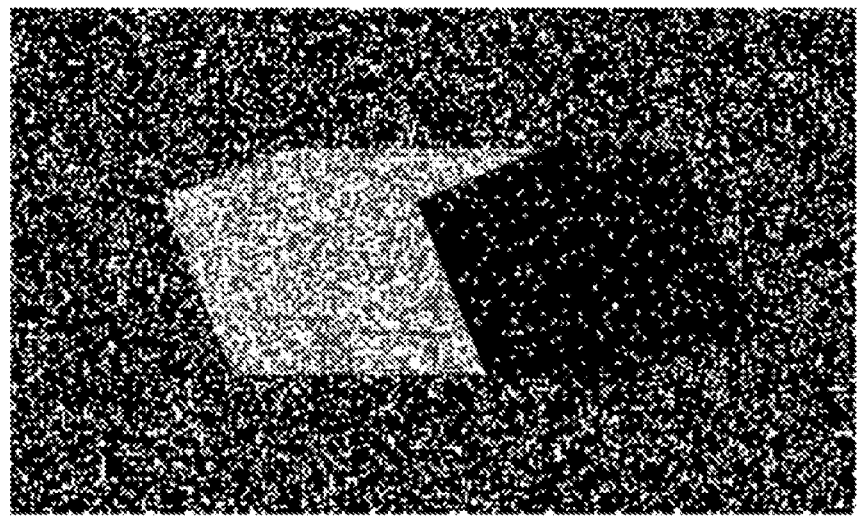
FIG. 4 is a diagram illustrating a schematic example of a SAR image in which speckles are generated.

When speckles are generated in a SAR image, a signal may be included also in an area that should be a radar shadow. FIG. 4 is a diagram illustrating a schematic example of a SAR image in which speckles are generated.

As described with reference to FIGS. 2 and 3, layover occurs in the reverse direction of the direction corresponding to the incident direction of an electromagnetic wave in a SAR image, relative to a structure causing the layover. That is, the reverse direction of the direction corresponding to the incident direction of an electromagnetic wave is the direction of layover.

In accordance with the above viewpoint, the direction estimation unit 112 only needs to be configured to estimate, as the direction of layover, the reverse direction of the direction corresponding to the incident direction of an electromagnetic wave.

Hereinafter, the direction of layover is also referred to as "layover direction".

===Search Range Determination Unit 113===

The search range determination unit 113 determines, on the basis of the layover direction estimated by the direction estimation unit 112, a search range in which the similar block extraction unit 114 to be described later searches for a similar block. When a plurality of reference blocks is set, the search range determination unit 113 determines a search range for each of the reference blocks.

For example, the search range determination unit 113 determines, as a search range, a range including a reference block and defined by a figure having the length in the layover direction longer than the length in the direction perpendicular to the layover direction.

Figure 5:
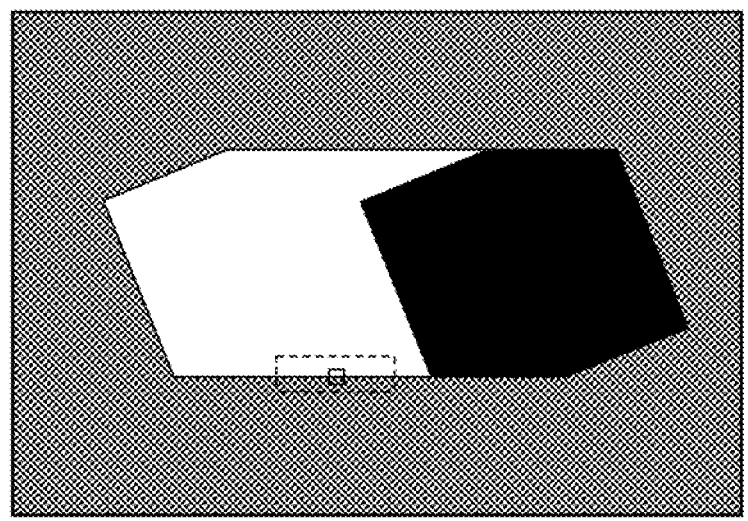
FIG. 5 is a diagram illustrating an example of a search range according to the first example embodiment.

FIG. 5 is a diagram illustrating an example of a search range determined by the search range determination unit 113. A rectangle drawn with a dashed line indicates the search range to be determined. A white rectangle in the search range indicates a reference block.

The shape of the search range exemplified in FIG. 5 is a rectangle that has two sides parallel to the layover direction and two sides perpendicular to the layover direction and includes a reference block. The two sides parallel to the layover direction are longer than the two sides perpendicular to the layover direction.

The shape of the search range to be determined by the search range determination unit 113 does not need to be a rectangle. The shape of the search range may be any polygon, circle, ellipse, or other closed curve. Note that the shape of the search range is such that the length in the layover direction is longer than the length in the direction perpendicular to the layover direction.

Figure 6:
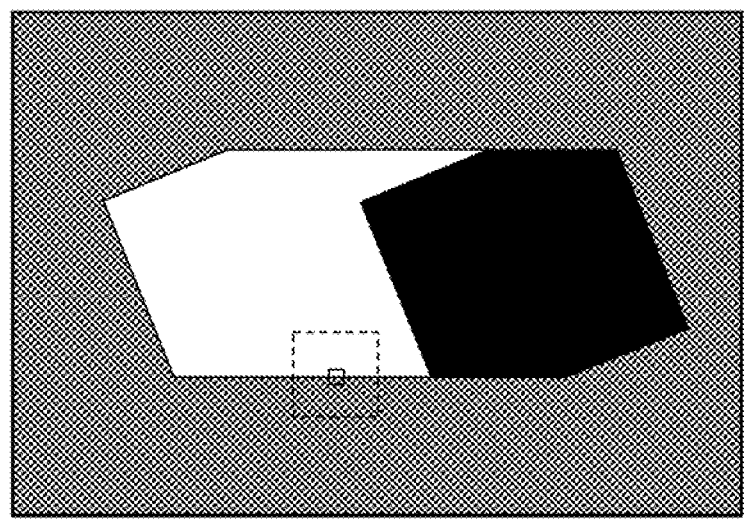
FIG. 6 is a diagram illustrating an example of a search range in a known technique.

FIG. 6 is a diagram exemplifying a search range that has already been proposed. A search range indicated by a dashed line in FIG. 6 is a range defined by a square centered on a reference block. According to the findings of the present inventors, search in such a search range is considered to be inefficient. The reason will be described in detail in the description of effects.

===Similar Block Extraction Unit 114===

The similar block extraction unit 114 searches for a similar block similar to a reference block from within a search range determined by the search range determination unit 113, and extracts the similar block.

The similar block is a block in which a distribution of pixel values (that is, signal intensities) is similar to that in the reference block. The term "similar" means that similarity is determined by an algorithm for evaluating similarity. In the present disclosure, the algorithm for evaluating similarity is not limited. An example of a method for evaluating similarity is described in NPL 1 (Chapter 3, "A. Block Similarity Measure").

For example, the similar block extraction unit 114 may calculate, for two blocks, an evaluation value representing similarity between the two blocks by a calculation formula using a value representing the magnitude of difference between pixel values related to the same position in the blocks. Then, when the evaluation value representing the similarity satisfies a predetermined condition (for example, when the evaluation value is equal to or less than a threshold value), the similar block extraction unit 114 only needs to determine that the two blocks are similar.

The similar block extraction unit 114 may extract, by scanning the search range determined by the search range determination unit 113, all similar blocks existing in the search range. Alternatively, the similar block extraction unit 114 may repeat, a prescribed number of times, processing of randomly extracting an area extractable as a block within the search range, and determining whether the extracted area (block) is similar to the reference block. Although the search method is not limited to the above-described method, the similar block extraction unit 114 at least uses an algorithm in which any of blocks in a search range determined by the search range determination unit 113 may be determined as a similar block.

===Filtering Processing Unit 115===

The filtering processing unit 115 performs filtering processing on a SAR image by using a reference block set by the reference block setting unit 111 and a similar block extracted by the similar block extraction unit 114. The filtering processing using the reference block and the similar block is a known matter as disclosed in NPL 1. Note that contents of the filtering processing are not limited to a method disclosed in NPL 1. Hereinafter, an outline of an example of the filtering processing will be described.

The filtering processing unit 115 first estimates, from the reference block and the similar block, signal intensity distributions in the blocks in a noiseless state. The estimation is on the basis of an idea that, if there is no noise, groups of reference blocks and similar blocks should all exhibit the same signal intensity distribution. The processing based on such an idea is also disclosed in NPL 2.

The filtering processing unit 115 similarly estimates a signal intensity distribution in the blocks in a noiseless state for all groups of reference blocks and similar blocks. As a result, each pixel in the SAR image is given an estimated value of the true signal intensity from estimation for each of the groups including the pixel.

Then, the filtering processing unit 115 aggregates the above-described estimated information to determine a correction value (corrected pixel value) for each pixel in the SAR image. For example, for each pixel, the filtering processing unit 115 determines, as the corrected pixel value, a weighted average value of estimated values given to the pixels.

The filtering processing unit 115 generates SAR image data by replacing the pixel value of each pixel with the correction value. The above is the outline of the example of the filtering processing.

===Output Unit 116===

The output unit 116 outputs SAR image data after filtering processing is performed.

Examples of an output destination of the output by the output unit 116 include a display device, a storage device, and a communication network. The display device and the storage device may be devices external to the radar image processing device 11 or may be components included in the radar image processing device 11. The output unit 116 may output data after processing a format of the data to be output into a format that can be interpreted by the device as the output destination. The processed data is also one of the SAR image data after the filtering processing is performed.

<Operation>

Figure 7:
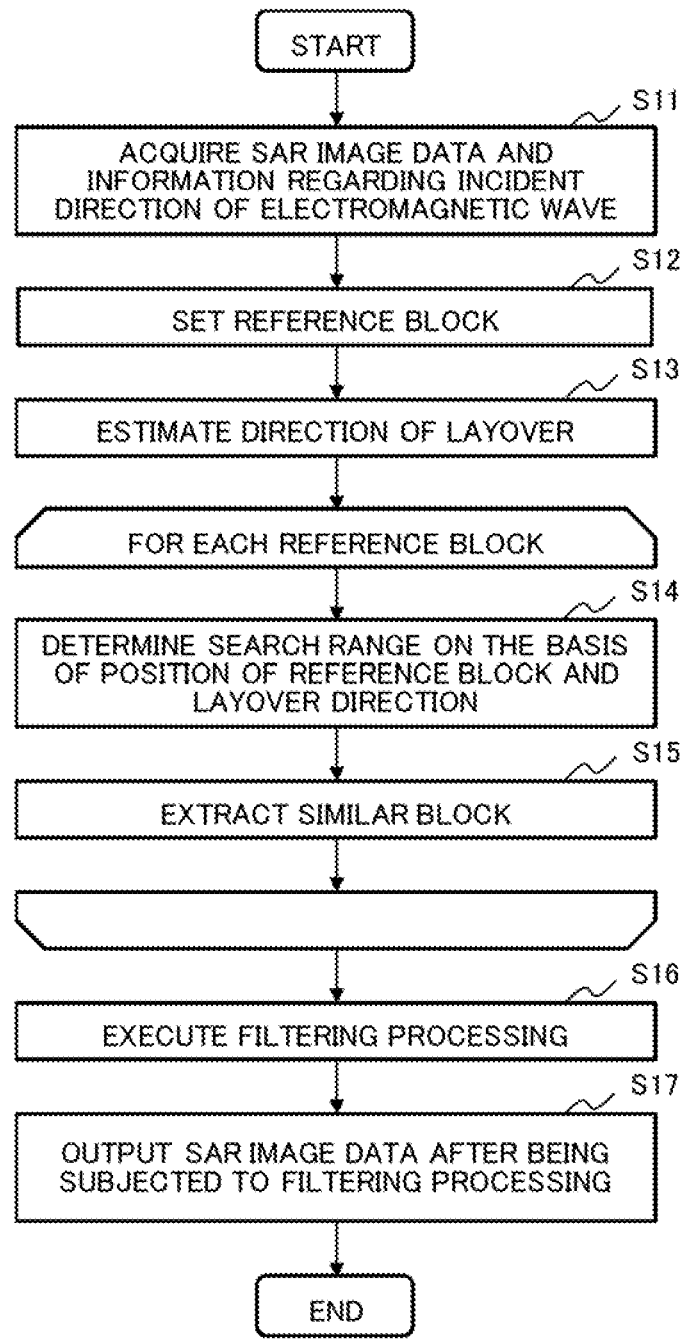
FIG. 7 is a flowchart illustrating a flow of processing in the radar image processing device according to the first example embodiment.

Hereinafter, a flow of processing performed by the radar image processing device 11 will be described with reference to a flowchart of FIG. 7. When each processing is executed by a processor executing a program, each processing only needs to be executed in the order of instructions in the program. When each processing is executed by a separate device, the next processing only needs to be executed by a device that has completed processing notifying a device that executes the next processing. Each unit performing processing only needs to receive data necessary for each processing from a unit that has generated the data or read the data from the storage area of the radar image processing device 11.

First, the data acquisition unit 110 acquires SAR image data and information regarding the incident direction of an electromagnetic wave (Step S11).

The reference block setting unit 111 sets a reference block in the SAR image (Step S12). The reference block setting unit 111 may set a plurality of reference blocks.

The direction estimation unit 112 estimates the direction of layover on the basis of the incident direction of the electromagnetic wave (Step S13).

Next, for each of the set reference blocks, the search range determination unit 113 determines a search range including the reference block on the basis of the position of the reference block and the layover direction (Step S14).

When the search range is determined, the similar block extraction unit 114 searches the determined search range and extracts a similar block similar to the target reference block (Step S15).

When the processing up to Step S15 is completed for each of the reference blocks, the filtering processing unit 115 executes filtering processing on the SAR image using the reference blocks and the similar blocks (Step S16). As a result, a SAR image with reduced speckle is generated.

Then, the output unit 116 outputs the SAR image data after being subjected to the filtering processing (Step S17).

The above-described order of the processing can be changed without deviating from the concept of the present disclosure. For example, the processing of Step S12 and the processing of Step S13 may be performed in reverse order or in parallel.

<Effects>

With the radar image processing device 11 according to the first example embodiment, it is possible to search for a similar block efficiently. The reason is that a search range determined by the search range determination unit 113 is a range defined by a figure having the length in the layover direction longer than the length in the direction perpendicular to the layover direction. The similar block extraction unit 114 preferentially searches, so to speak, the layover direction.

Particularly, in a SAR image obtained as a result of measurement of a building and a similar structure, when a reference block is included in an area where layover occurs, a similar block similar to the reference block tends to exist in the layover direction (or the reverse direction) as viewed from the reference block. The reason is as follows. In the actual space, a structure such as a building often has, in the vertical direction, a plurality of similar portions having similar shapes and materials (for example, a window on the 5th floor and a window on the 6th floor). The similar portions should give similar signal intensity distributions in the SAR image. Since signals from reflection points arranged in the vertical direction (that is, differing only in altitude) in the actual space are arranged in the layover direction in the SAR image, the similar signal intensity distributions are expected to be arranged in the layover direction.

Thus, by searching the search range as described above, the similar block extraction unit 114 can more easily detect a similar block. As a result, the similar block extraction unit 114 can detect more similar blocks than in the search based on a known search range. That is, since similar blocks are efficiently detected, performance of filtering processing is improved. Alternatively, in an example embodiment in which the target number of similar blocks to be detected is determined, the amount of calculation required to detect the target number of the similar blocks is reduced.

That is, with the radar image processing device 11, performance of filtering processing relative to a calculation cost is improved.

[First Modification]

A modification of the first example embodiment will be described below, in which a method for determining a search range by the search range determination unit 113 is different.

(1)

In one modification, the search range determination unit 113 may determine a prescribed range as a search range when a target reference block does not overlap an area where layover occurs. Conversely, the search range determination unit 113 may determine a search range on the basis of the layover direction only when the target reference block overlaps the area where layover occurs.

When determining a search range on the basis of the layover direction, the search range determination unit 113 may determine the search range also on the basis of a range of the area where layover occurs in the layover direction.

Figure 8:
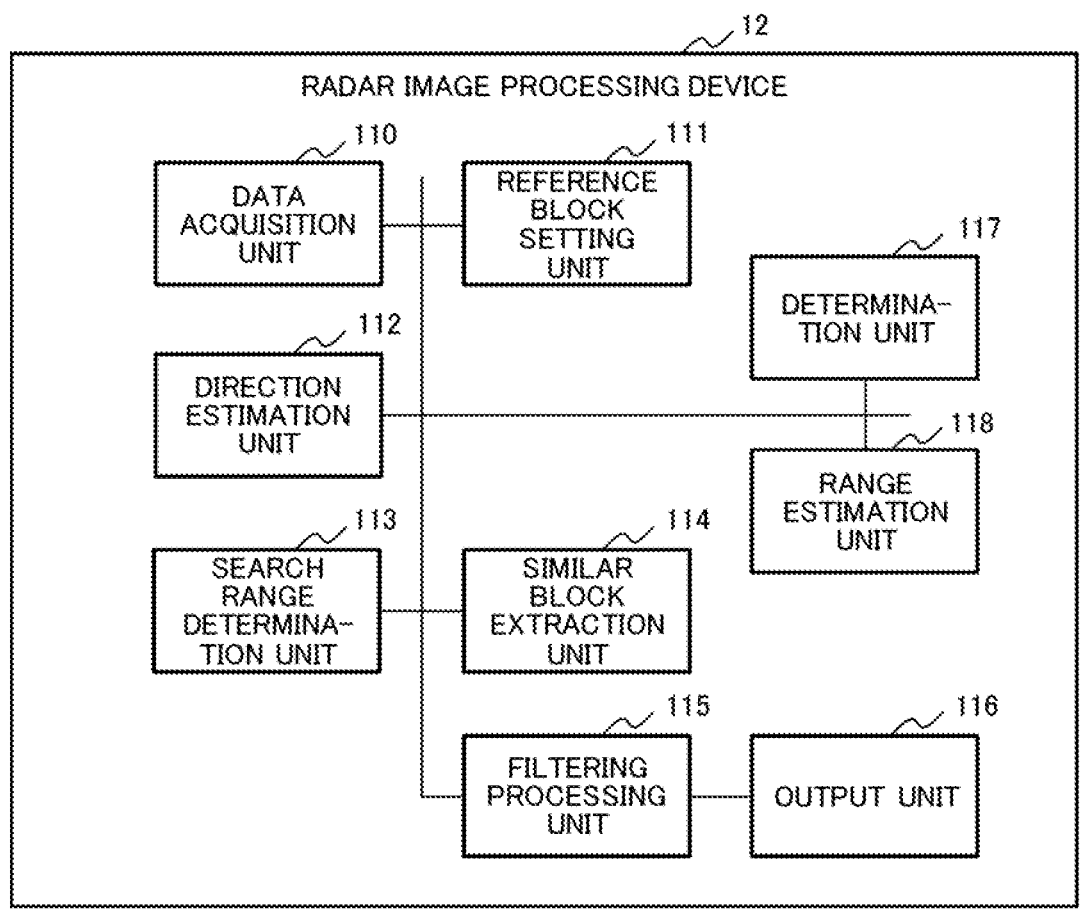
FIG. 8 is a block diagram illustrating a configuration of a first modification of the radar image processing device according to the first example embodiment.

FIG. 8 is a block diagram of a radar image processing device 12 as an example of a radar image processing device according to the present modification. The radar image processing device 12 includes a determination unit 117 and a range estimation unit 118, in addition to the same components as those of the radar image processing device 11 of the first example embodiment.

Unless otherwise stated, a function of a component having the same name as that of the component of the radar image processing device 11 of the first example embodiment may be understood to be the same as the function of the corresponding component.

===Determination Unit 117===

The determination unit 117 determines whether a target reference block overlaps an area where layover occurs. Overlapping of two areas means that the two areas include at least one common pixel.

The determination by the determination unit 117 uses, for example, information representing, by three-dimensional coordinates, the shape and the position of a structure imaged on a SAR image in the actual space (hereinafter also referred to as "structure information"). The structure information is a digital surface model (DSM), for example. Coordinates in the structure information and coordinates in the SAR image can be associated with each other on the basis of information regarding measurement conditions at the time of measurement by a SAR. Note that one point in the area where the layover occurs in the SAR image is associated with a plurality of points in the structure information.

The data acquisition unit 110 only needs to acquire the structure information of the structure imaged on the SAR image.

The determination unit 117 only needs to determine whether a point included in the reference block is associated with a plurality of points in the structure information.

Figure 9:
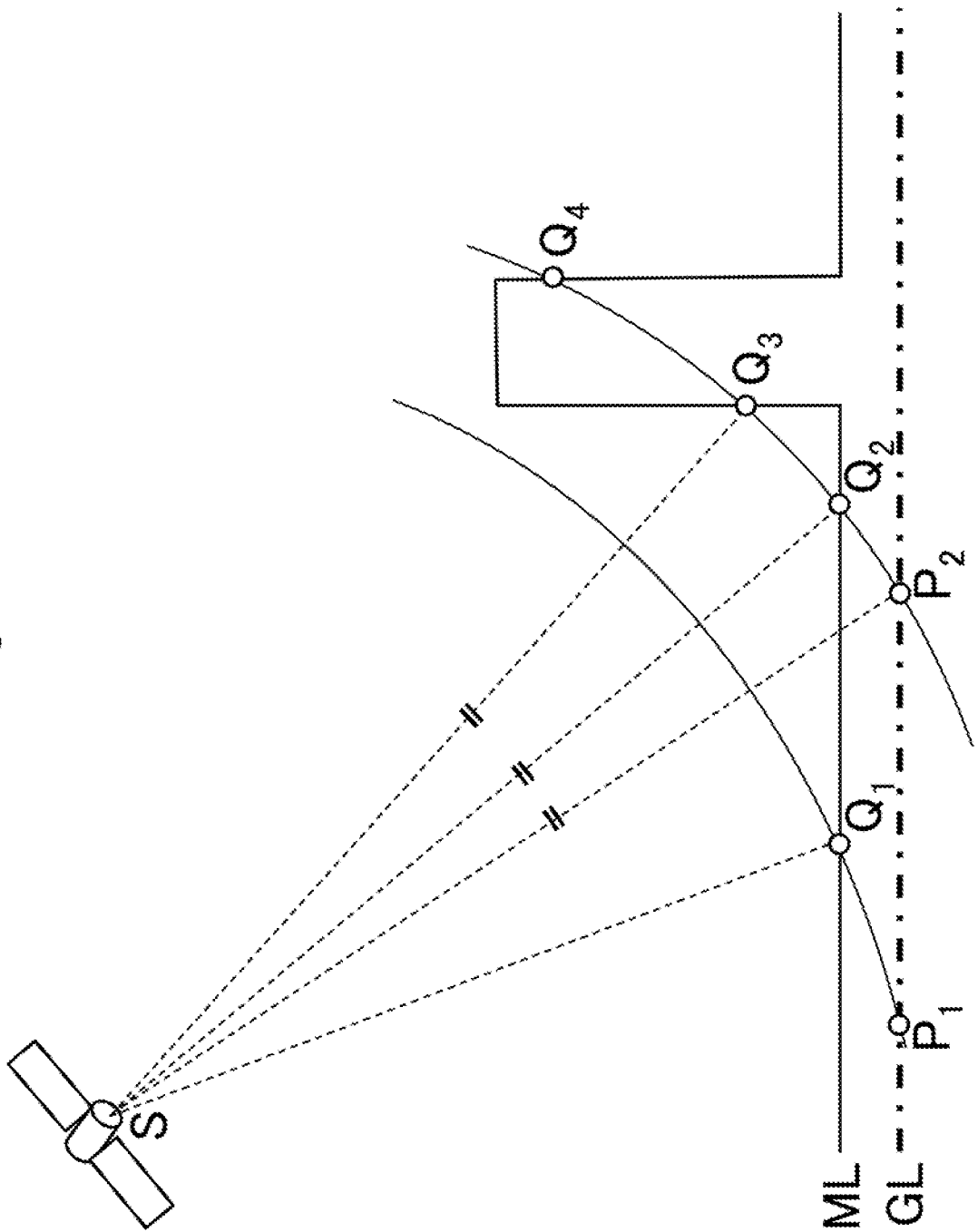
FIG. 9 is a diagram for describing a method for specifying a point where layover occurs.

A concept of the determination method will be described with reference to FIG. 9. FIG. 9 is a cross-sectional diagram obtained by cutting out a three-dimensional structure represented by structure information by a plane perpendicular to the azimuth direction. A line ML is a cross-sectional line of the surface of the three-dimensional structure represented by the structure information. A line GL is a cross-sectional line of a reference plane of a SAR image (that is, a reference plane of a coordinate system for generating the SAR image). A point S indicates the position of a radar.

For example, it is assumed that certain two points (points $p_1$ and $p_2$) included in the SAR image correspond to points $P_1$ and $P_2$ indicated by white circles in FIG. 9. The signal intensity indicated by a pixel at the point $p_1$ in the SAR image reflects the intensity of a reflected wave from a point on the line ML (that is, a point $Q_1$ in FIG. 9) at the same distance as the distance between the point S and the point $P_1$ (distance $R_1$). Since an arc with a radius $R_1$ centered on the point S does not intersect the line ML except at the point $Q_1$, it is considered that only the intensity of the reflected wave from the point $Q_1$ is reflected in a luminance value indicated by the pixel at the point $p_1$. That is, the point $P_1$ is not included in an area where layover occurs. On the other hand, the signal intensity indicated by a pixel at the point $p_2$ in the SAR image reflects the intensity of a reflected wave from a point on the line ML at the same distance as the distance between the point S and the point $P_2$ (distance $R_2$). Since an arc with a radius $R_2$ centered on the point S intersects the line ML at points $Q_2$ and $Q_3$, it is considered that the intensities of reflected waves from the points $Q_2$ and $Q_3$ are reflected in a luminance value indicated by the pixel at the point $p_2$. That is, the point $p_2$ is included in the area where layover occurs. A point $Q_4$ in FIG. 9 is not taken into consideration because the point does not receive a radio wave.

In accordance with the above-described idea, the determination unit 117 only needs to make determination whether a certain target point is included in the area where layover occurs (hereinafter referred to as "inclusion determination"), on the basis of whether the number of intersections of the line ML with an arc whose radius is the distance between the target point and the point S is equal to or more than two. Then, when the point included in the area where layover occurs exists in a reference block, the determination unit 117 only needs to determine that the reference block overlaps the area where layover occurs. The determination unit 117 may perform the inclusion determination for all points included in the reference block, or may perform the inclusion determination for one point (center point or the like) or a plurality of points (randomly extracted points, vertexes, or the like) included in the reference block.

Figure 10:
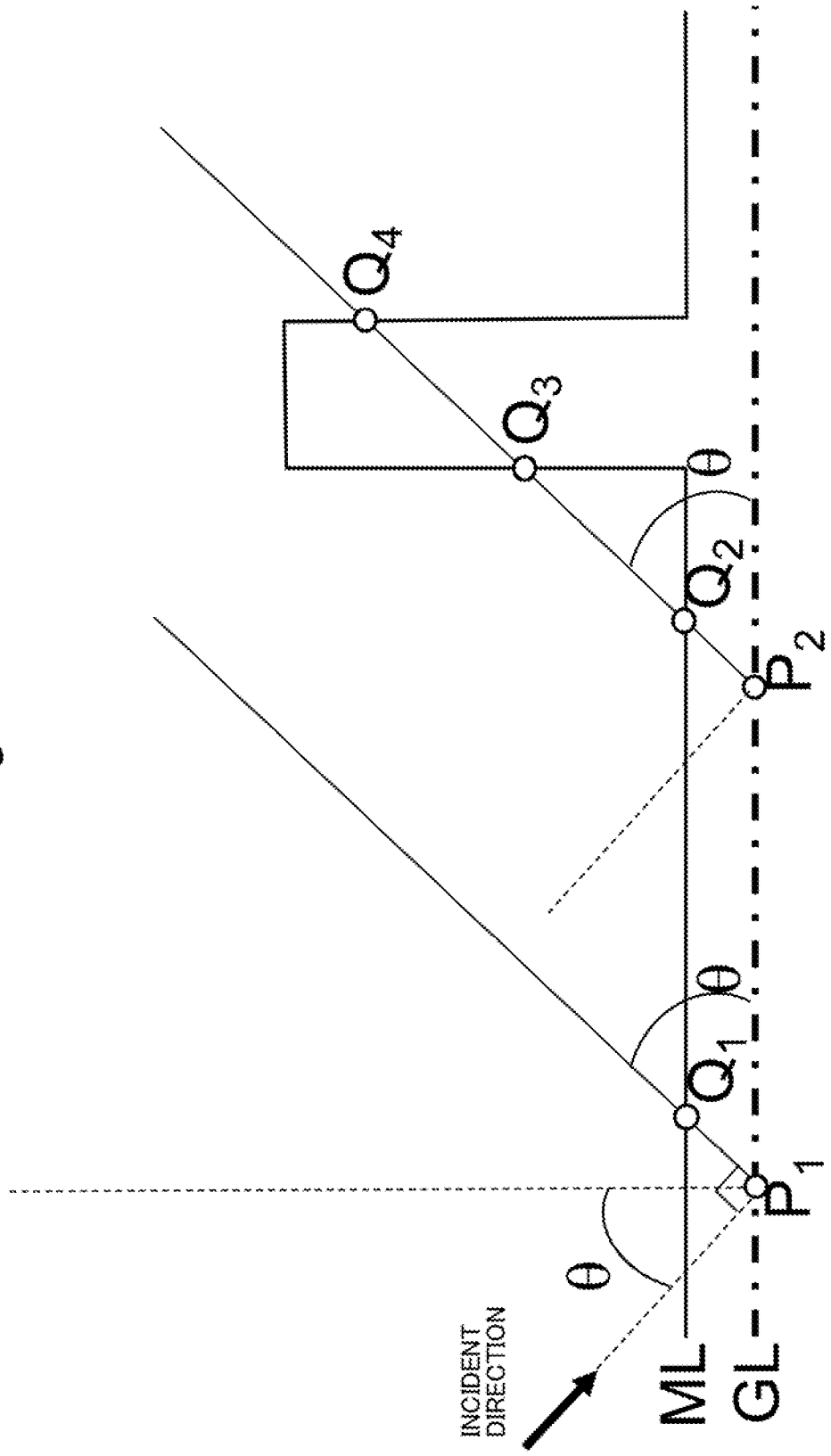
FIG. 10 is another diagram for describing the method for specifying a point where layover occurs.

When the radar is sufficiently far from a structure, an arc whose radius is the distance between a point on the line GL and the point S can be approximated as a straight line. In such a case, the number of intersections of the arc with the line ML is the number of intersections of the approximated straight line with the line ML. The approximated straight line is a straight line perpendicular to the incident direction of a radio wave from the point S. In other words, the approximated straight line intersects the line GL at the same angle as an incident angle θ (angle formed by a vertical line and the incident direction). Thus, the determination unit 117 may perform the inclusion determination on the basis of the number of intersections of the line ML with a straight line passing through a target point on the line GL and intersecting the line GL at the same angle as an incident angle (note that the intersections of the straight line with the line ML are not closer to the point S than the target point) (FIG. 10). The incident angle is obtained from information regarding the incident direction that can be acquired by the data acquisition unit 110.

The determination method is not limited to the above-described method. For example, when an area where layover occurs in a SAR image is known, the determination unit 117 only needs to refer to a target reference block and the area where layover occurs and determine whether both of the target reference block and the area where layover occurs include a common pixel.

Hereinafter, an area where layover occurs including an overlap with a reference block is referred to as "layover area". The "layover area" assumed in the following description is an area of layover originating from a single structure.

The range estimation unit 118 estimates a range in the layover direction of a layover area. The range in the layover direction of a layover area (hereinafter also referred to as "layover range") is a range from an end point of the layover area in the layover direction as seen from a reference block to an end point of the layover area in the opposite direction of the layover direction as seen from the reference block.

In other words, the layover range is a range from a point corresponding to a point closest to a radar ("nearest point") to a point corresponding to a point farthest from the radar ("farthest point") among points at which coordinate values in the azimuth direction are the same as those at points in the reference block and which contribute to signals in the layover area. Note that the "point in the reference block" may mean all points in the reference block or a specific point (for example, a center point) in the reference block.

Figure 11:
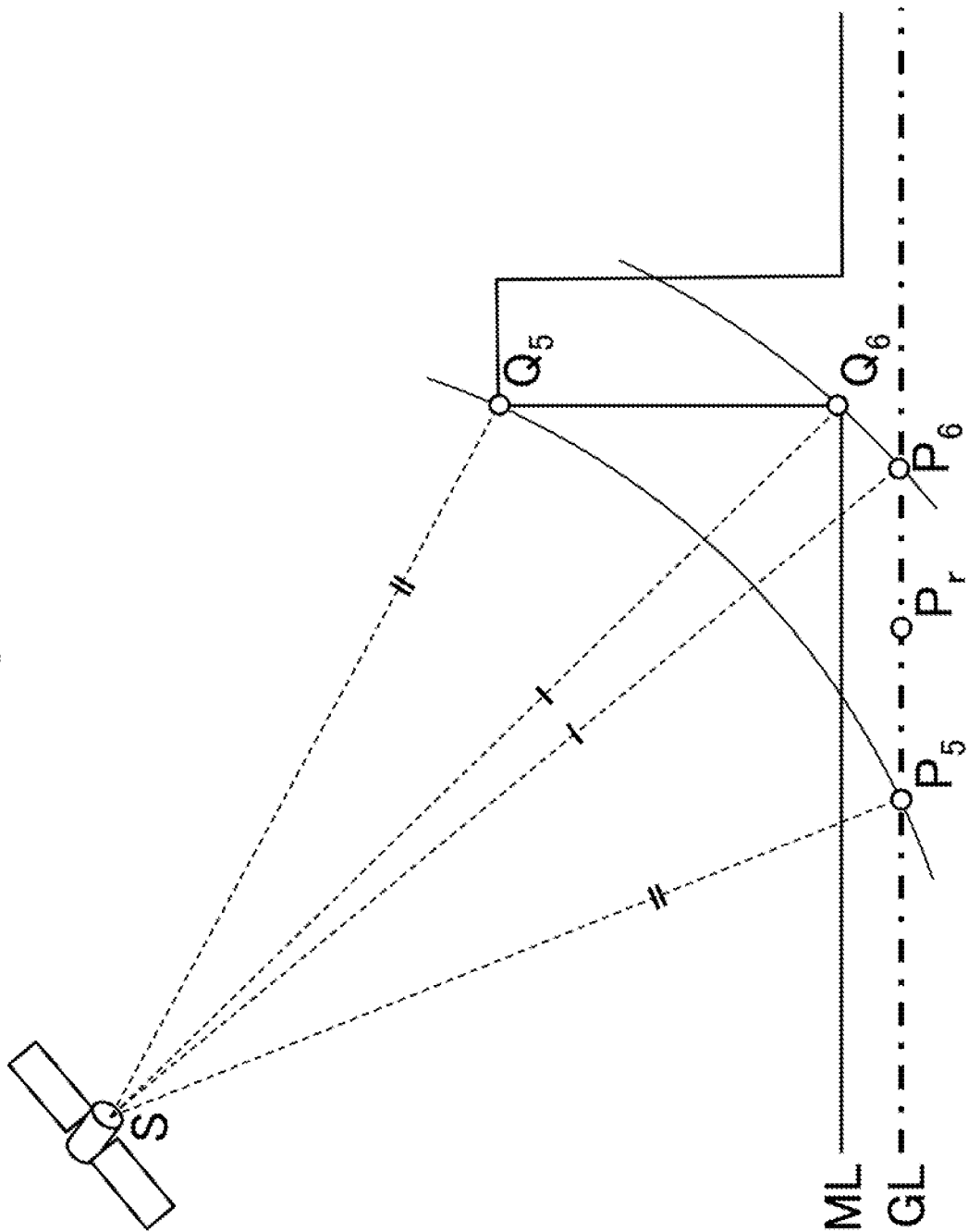
FIG. 11 is a diagram for describing a method for specifying end points of a layover range.

An outline of an example of a method for specifying end points of the layover range, that is, the nearest point and the farthest point will be described with reference to FIG. 11. FIG. 11 is a cross-sectional diagram of a three-dimensional structure represented by structure information cut out by a plane including a point $P_r$ corresponding to one point in a reference block and perpendicular to the azimuth direction. The point $P_r$ corresponds to a center point of the reference block, for example. In FIG. 11, a point closest to the point S among points on the line ML that contribute to signals in the layover range is a point $Q_5$. Since the intensity of a reflected wave from the point $Q_5$ is reflected to a position corresponding to a point $P_5$ in a SAR image, a point in the SAR image corresponding to the point $P_5$ is a nearest point. In FIG. 11, a point farthest from the point S among the points on the line ML that contribute to the signals in the layover range is a point $Q_6$. Since the intensity of a reflected wave from the point $Q_6$ is reflected to a position corresponding to a point $P_6$ in the SAR image, a point in the SAR image corresponding to the point $P_6$ is a farthest point.

Figure 12:
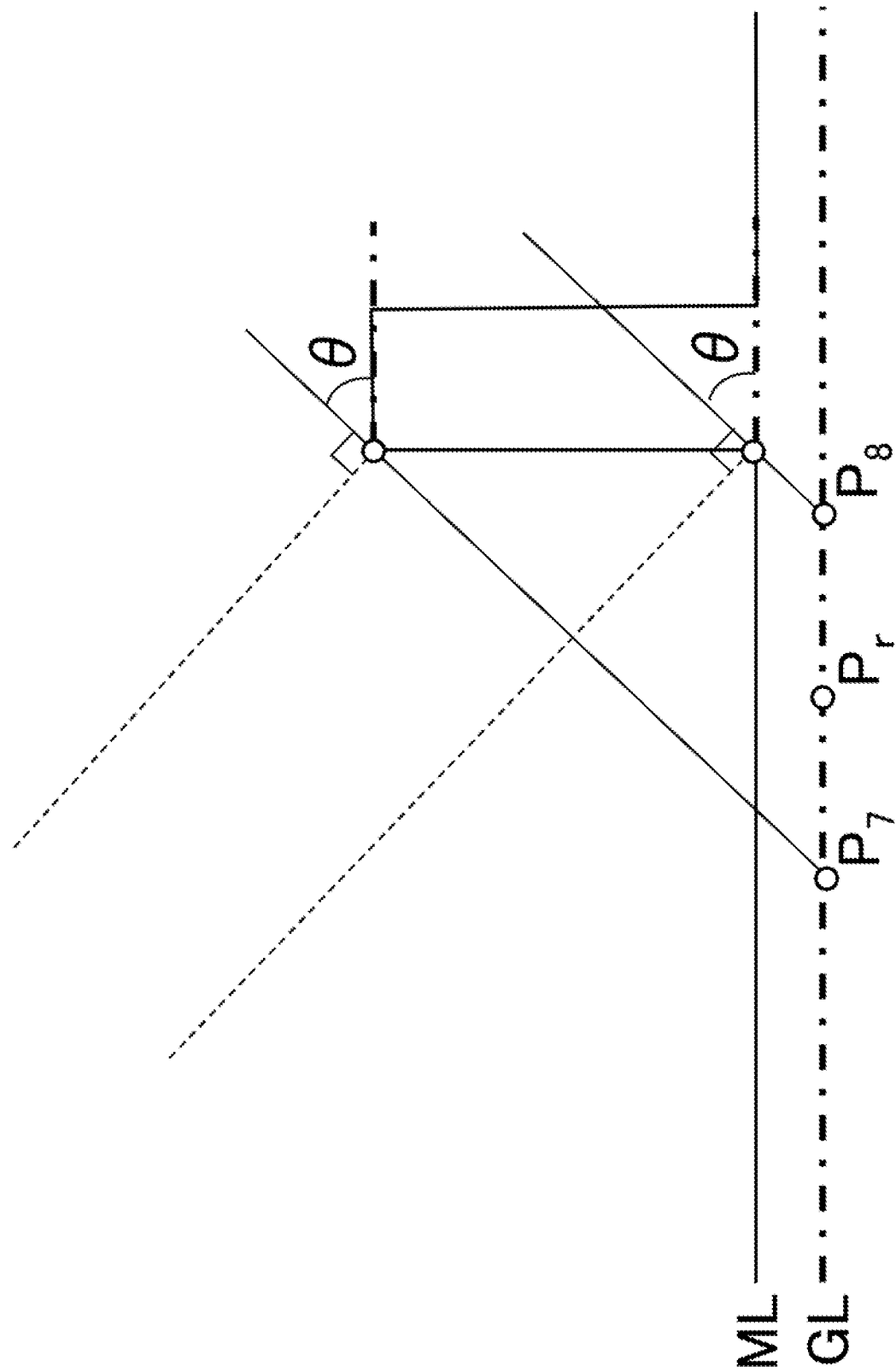
FIG. 12 is another diagram for describing the method for specifying end points of a layover range.

When the point S can be regarded as sufficiently far, points corresponding to the nearest point and the farthest point are points $P_7$ and $P_8$ indicated in FIG. 12, respectively. The range estimation unit 118 only needs to specify, as a nearest point, a point corresponding to an intersection (point $P_7$) of the line GL with a straight line closest to a radar side among straight lines intersecting the line GL at the same angle as the incident angle θ (note that intersections of the straight lines with the line ML are not closer to the point S than intersections of the straight lines with the line GL) and passing through points contributing to layover. The range estimation unit 118 only needs to specify, as a farthest point, a point corresponding to an intersection (point $P_8$) of the line GL with a straight line farthest from the radar side among straight lines intersecting the line GL at the same angle as the incident angle θ and passing through points that can contribute to layover.

The length of a line segment connecting a nearest point and a farthest point is also referred to as "layover length" in the present disclosure.

The range estimation unit 118 may generate, as information representing an estimated layover range, information regarding coordinates of a nearest point and a farthest point, or information regarding the distance from a reference block to the nearest point and the distance from the reference block to the farthest point.

The search range determination unit 113 determines a search range on the basis of the layover direction and the layover range. The search range determination unit 113 determines, as a search range, an area defined by a figure having both ends of the layover area as its ends, for example.

Figure 13:
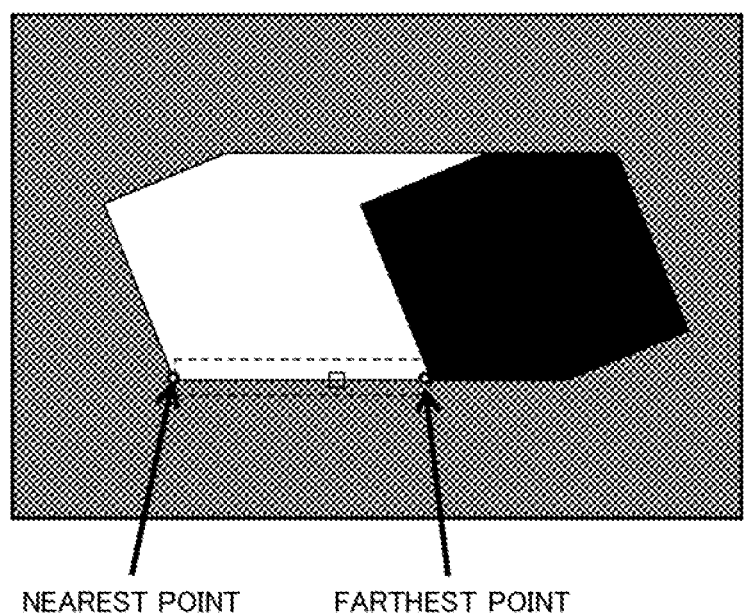
FIG. 13 is a diagram illustrating an example of a search range in the first modification.

FIG. 13 is a diagram illustrating an example of a search range determined by the search range determination unit 113 in the present modification. A search range exemplified by a dashed line in FIG. 13 is a rectangle having both ends (a nearest point and a farthest point) of a layover area as its ends. It can also be said that the search range determination unit 113 determines a search range in accordance with the shape of the layover area.

Figure 14:
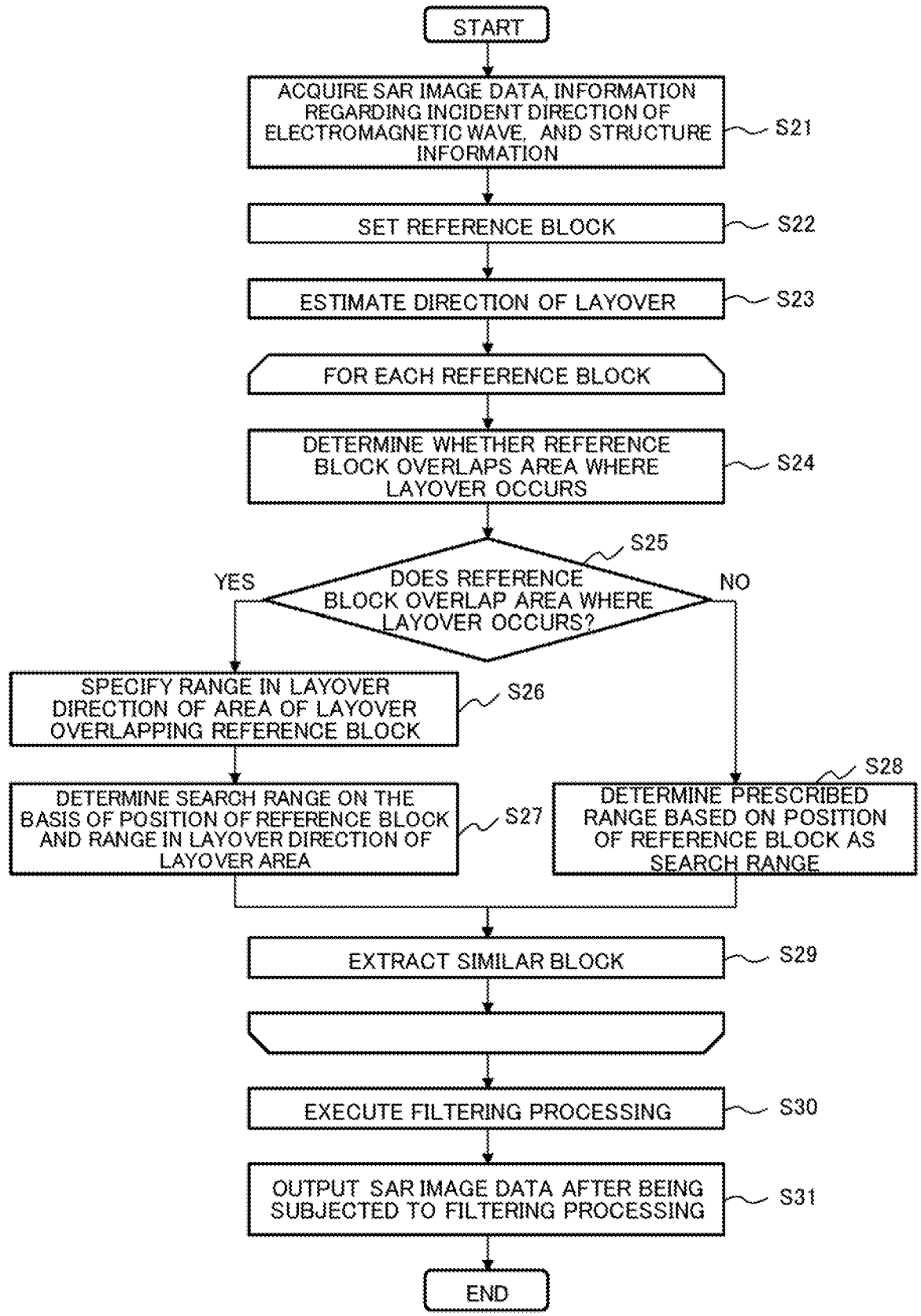
FIG. 14 is a flowchart illustrating a flow of processing in the radar image processing device according to the first modification.

A flow of processing performed by the radar image processing device 12 according to the present modification will be described with reference to a flowchart of FIG. 14.

First, the data acquisition unit 110 acquires SAR image data, information regarding the incident direction of an electromagnetic wave, and structure information of a structure imaged on a SAR image (Step S21). Next, as in the processing of Steps S12 and S13, the reference block setting unit 111 sets a reference block (Step S22), and the direction estimation unit 112 estimates the direction of layover (Step S23).

Then, the radar image processing device 12 performs the following processing from Step S24 to Step S29 for each reference block.

First, in Step S24, the determination unit 117 determines whether a target reference block overlaps an area where layover occurs.

When the target reference block overlaps the area where layover occurs (YES in Step S25), the range estimation unit 118 specifies a range in the layover direction of the area where the layover occurs overlapping the reference block (layover area) (Step S26). Then, the search range determination unit 113 determines a search range on the basis of the position of the reference block and the range in the layover direction of the layover area (Step S27).

When the target reference block does not overlap the area where layover occurs (NO in S25), the search range determination unit 113 determines a prescribed range based on the position of the reference block as a search range (Step S28).

When the search range is determined, the similar block extraction unit 114 extracts a similar block (Step S29).

When the processing up to Step S29 is performed for each reference block, the processing proceeds to Step S30. In Step S30, the filtering processing unit 115 performs filtering processing as in the processing of Step S16.

Then, the output unit 116 outputs the SAR image data after being subjected to the filtering processing (Step S31).

The above-described order of the processing can be changed without deviating from the concept of the present disclosure. For example, the acquisition of structure information, which is part of the processing of Step S21, may be performed after Step S23.

According to the present modification, it is possible to search for a similar block more efficiently. The reason is that the search range determination unit 113 determines a search range on the basis of the layover direction when a reference block overlaps an area where layover occurs. Another reason is that the search range determination unit 113 determines a search range on the basis of the range of the area where layover occurs, in which a similar block tends to exist.

(2)

In one modification, the search range determination unit 113 may also determine, as a part of a search range, an area where layover occurs due to a structure (to be described later) of the same type as a structure contributing to layover overlapping a reference block.

Figure 15:
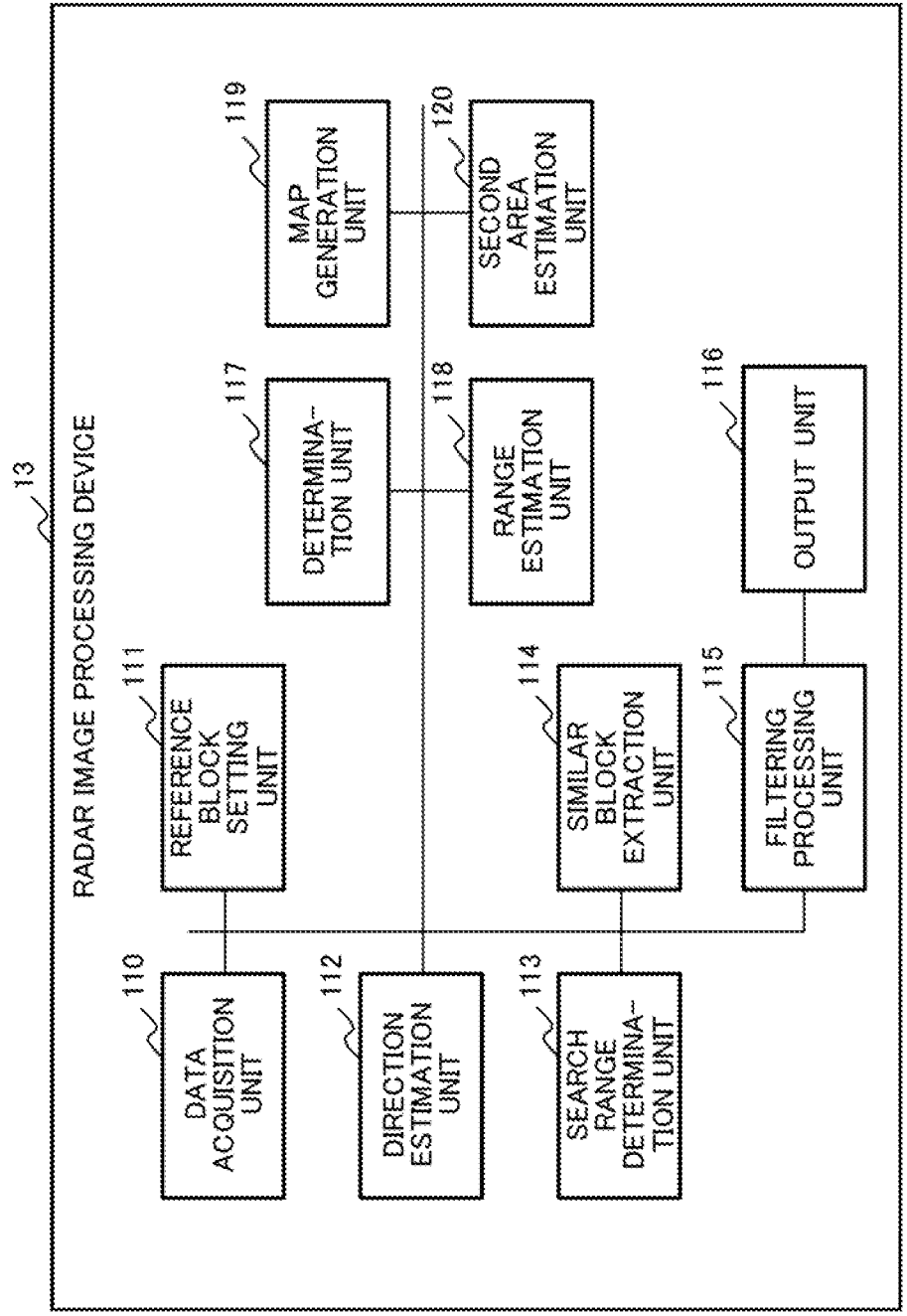
FIG. 15 is a block diagram illustrating a configuration of a second modification of the radar image processing device according to the first example embodiment.

FIG. 15 is a block diagram of a radar image processing device 13 as an example of a radar image processing device according to the present modification. The radar image processing device 13 includes the determination unit 117, the range estimation unit 118, a map generation unit 119, and a second area estimation unit 120, in addition to the same components as those of the radar image processing device 11 of the first example embodiment.

Unless otherwise stated, a function of a component having the same name as that of the component of the radar image processing device 11 or the radar image processing device 12 described above may be understood to be the same as the function of the corresponding component.

===Map Generation Unit 119===

The map generation unit 119 generates a map indicating a distribution of the types of structures in the same two-dimensional coordinate system as a coordinate system of a target SAR image. The map as described above can be said to be a map showing an area where layover occurs due to structures of the same type in the SAR image. Hereinafter, a map generated by the map generation unit 119 is also referred to as "same type map".

In the present disclosure, the fact that the types of two structures are the same is synonymous with the fact that the two structures exhibit similar reflective properties in part or in whole. Examples of the case where the types of two structures are the same include a case where the two structures are composed of the same substance, and a case where the two structures have the same structure. The fact that the types of two structures are the same may be expressed as the fact that the two structures are of the same type. It is considered that, when two structures are of the same type, a similar block similar to a reference block reflecting a reflected wave from one of the two structures tends to be extracted from an area reflecting a reflected wave from the other of the two structures.

To specify structures of the same type, the radar image processing device 13 causes the data acquisition unit 110 to acquire structure information representing the three-dimensional position and shape and the type of a structure to be imaged on a SAR image. The map generation unit 119 only needs to generate a same type map using the structure information. Specifically, the map generation unit 119 can generate the same type map by projecting a three-dimensional structure (information regarding the type is also given) represented by the structure information onto a reference plane of the SAR image. Note that, in the projection, the map generation unit 119 does not project an area where an incident wave does not hit.

Figure 16:
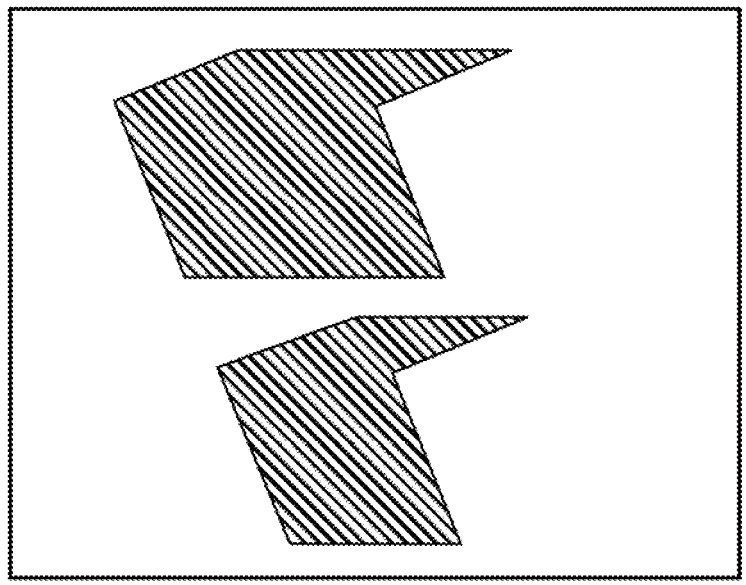
FIG. 16 is a diagram illustrating a schematic example of a same type map in the second modification.

FIG. 16 is an example of a same type map generated for a SAR image on which two buildings of the same type are imaged. Shaded areas represent areas where signals from the buildings of the same type are reflected in the SAR image. Note that the same type map is not necessarily generated as an image. The same type map only needs to be data indicating an area where signals from buildings of the same type are reflected in a SAR image.

===Second Area Estimation Unit 120===

The second area estimation unit 120 estimates an area where layover occurs by another structure of the same type as a structure causing layover overlapping a reference block. Hereinafter, an area estimated by the second area estimation unit 120 is also referred to as a second area.

The second area estimation unit 120 can estimate the second area from a same type map generated by the map generation unit 119. Specifically, the second area estimation unit 120 only needs to specify an area indicated as an area of the same type as an area overlapping the reference block in the same type map.

===Search Range Determination Unit 113===

When a reference block overlaps an area where layover occurs, the search range determination unit 113 of the present modification determines, as a search range, an area in accordance with the shape of the area (that is, layover area) and an area in accordance with the shape of a second area.

Figure 17:
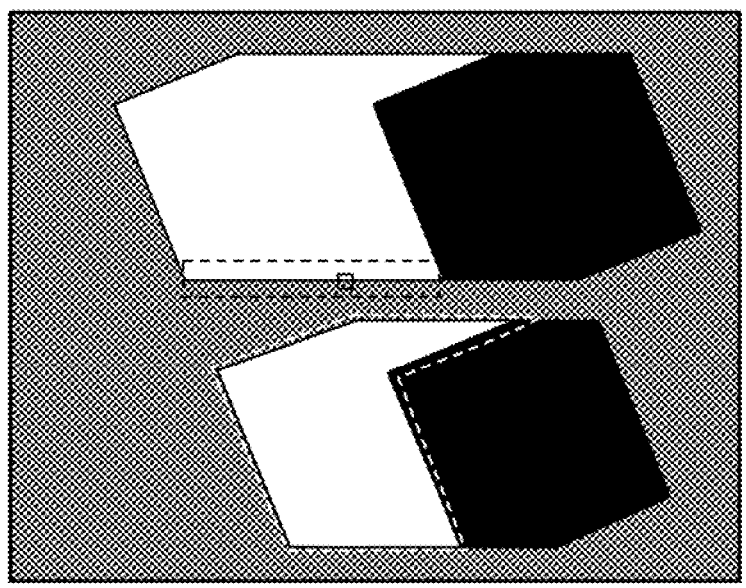
FIG. 17 is a diagram illustrating an example of search ranges in the second modification.

FIG. 17 is a diagram illustrating an example of search ranges. In FIG. 17, two areas surrounded by dashed lines are search ranges. As a search range in accordance with the shape of a layover area, the search range determination unit 113 only needs to determine an area based on a range in the layover direction of the layover area. As a search range in accordance with the shape of a second area, the search range determination unit 113 only needs to determine an area surrounding the second area along the contour of the second area.

Figure 18:
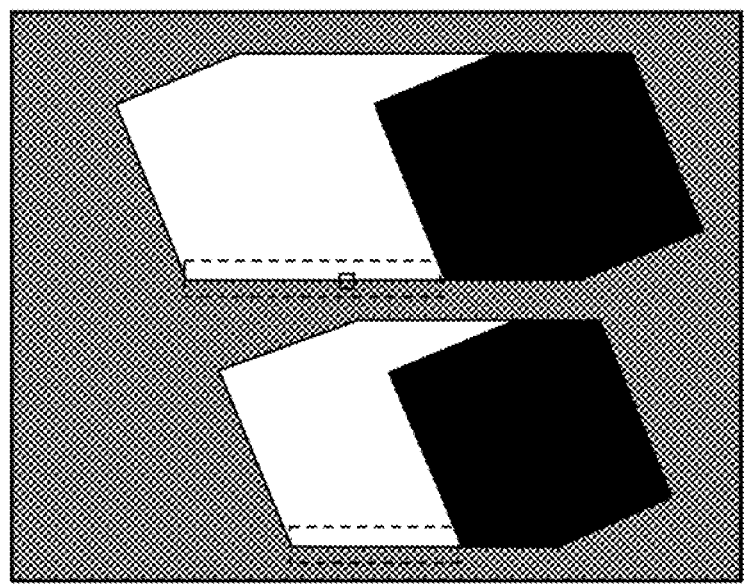
FIG. 18 is a diagram illustrating another example of the search ranges in the second modification.

When similar portions can be specified in structures of the same type, the search range determination unit 113 may determine, as a search range in accordance with the shape of a second area, an area that is similar to a portion corresponding to a search range including a reference block and corresponds to a portion in a structure of the same type. FIG. 18 is a diagram illustrating an example of search ranges when two areas corresponding to two similar portions are determined as search ranges. In FIG. 18, the search ranges are indicated by two black dashed lines. In order for the search range determination unit 113 to specify similar portions in structures of the same type, the data acquisition unit 110 may acquire more detailed three-dimensional information indicating position information of similar substructures. The map generation unit 119 may then generate a more detailed same type map showing arrangement of the similar substructures in a SAR image.

Figure 19:
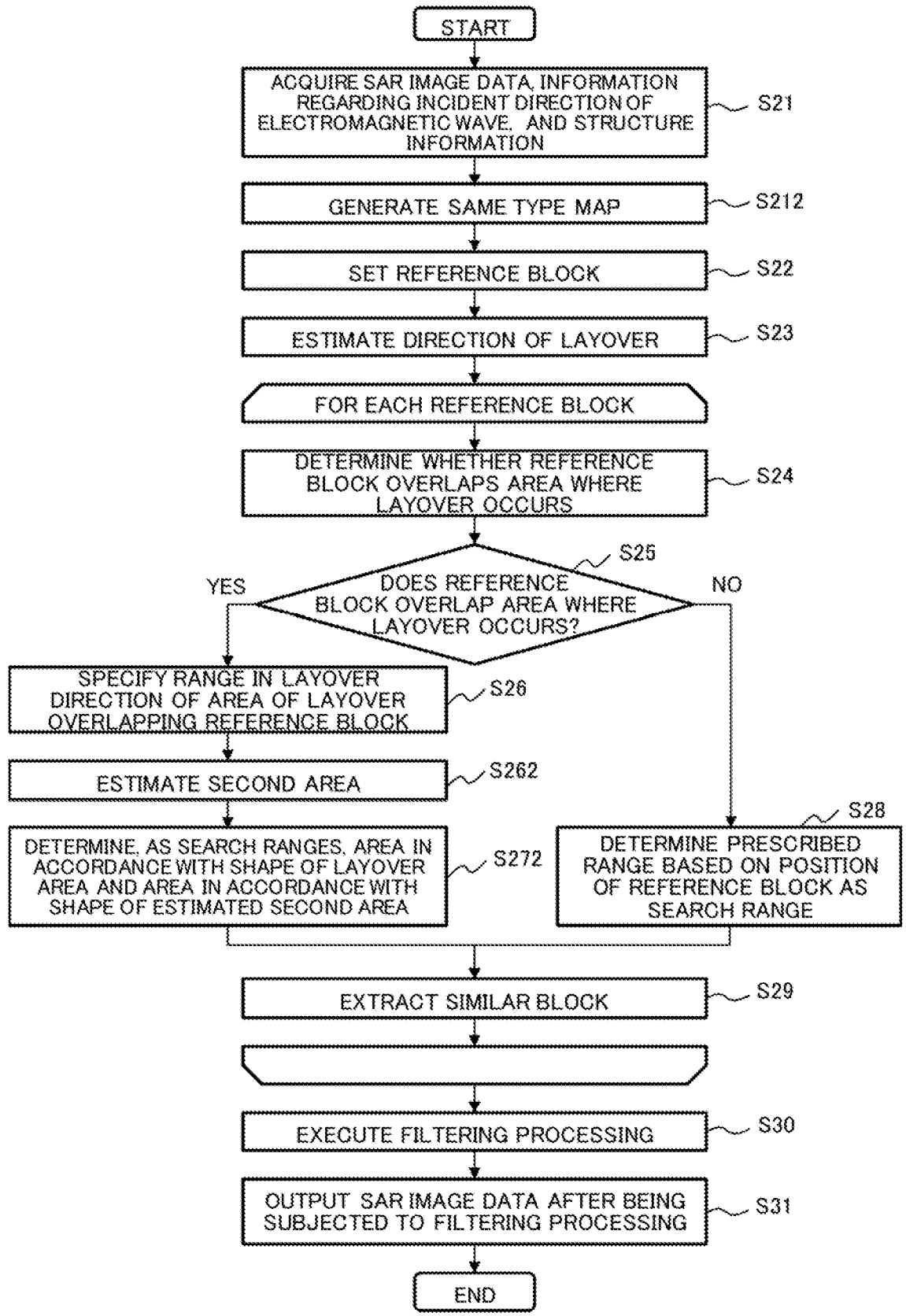
FIG. 19 is a flowchart illustrating a flow of processing in the radar image processing device according to the second modification.

A flow of processing performed by the radar image processing device 13 according to the present modification will be described with reference to a flowchart of FIG. 19. The processing performed by the radar image processing device 13 is substantially the same as the processing performed by the radar image processing device 12 (FIG. 14). The processing performed by the radar image processing device 13 includes processing of Step S212 and processing of Step S262, and processing of Step S272 is performed instead of the processing of Step S27.

The processing of Step S212 is performed after the processing of Step S21. In Step S212, the map generation unit 119 generates a same type map for the same range as that of the SAR image on the basis of the structure information. The processing of Step S212 may be performed after the processing of Step S22.

The processing of Step S262 is performed when the determination in Step S25 is YES. In Step S262, the second area estimation unit 120 estimates a second area.

In Step S272, the search range determination unit 113 determines, as search ranges, an area in accordance with the shape of the layover area and an area in accordance with the shape of the estimated second area.

With the above-described configuration, the similar block extraction unit 114 searches the area in accordance with the shape of the second area. There is a high probability that a similar block exists in the second area since the second area is an area where layover occurs due to a structure of the same type as a structure contributing to layover overlapping the reference block. Thus, the similar block extraction unit 114 can extract a similar block efficiently.

A modification of the operation of the radar image processing device 13 will be described. The search range determination unit 113 may redetermine a search range while the similar block extraction unit 114 is performing the processing of extracting the similar block.

For example, the search range determination unit 113 determines, in the processing of Step S272, the areas indicated by the dashed lines in FIG. 17 as provisional search ranges. Thereafter, when the similar block extraction unit 114 extracts a similar block in the second area in Step S29, the search range determination unit 113 may reset a search range in the second area on the basis of the position of the similar block and the layover direction. For example, the search range determination unit 113 may redetermine, as a search range in the second area, a range including the extracted similar block and defined by a figure having the length in the layover direction longer than the length in the direction perpendicular to the layover direction. After the search range is redetermined, the similar block extraction unit 114 searches the redetermined search range.

With such a configuration, the similar block extraction unit 114 searches an area from which a similar block is more easily extracted in the second area.

[Second Modification]

In the radar image processing devices 11 to 13, search ranges for similar blocks similar to second and subsequent reference blocks may be determined by using information regarding a search range for a similar block similar to a first reference block.

For example, the search range determination unit 113 may determine ranges defined by a figure that is congruent with the search range for the similar block similar to the first reference block as the search ranges for the similar blocks similar to the second and subsequent reference blocks.

Particularly, when a certain reference block (second reference block) overlaps a layover area overlapping the first reference block, there is a high probability that the layover length coincides with the layover length derived for the first reference block. The search range determination unit 113 may determine, as a search range for a similar block similar to the second reference block, a range of an area in which the length in the layover direction is the layover length derived for the first reference block.

When a second area has been estimated for the first reference block, it is not necessary to estimate a second area again for the second reference block overlapping a layover area overlapping the first reference block. The reason is that the second area related to the second reference block is the second area related to the first reference block. The search range determination unit 113 may employ, as a search range in the second area related to the second reference block, a search range (in the second area) set for the first reference block. Alternatively, the search range determination unit 113 may determine, as the search range in the second area related to the second reference block, an area displaced from the search range (in the second area) set for the first reference block on the basis of a positional relationship between the first reference block and the second reference block.

With such a configuration, the amount of calculation related to determination of a search range can be reduced.

Second Example Embodiment

A radar image processing device 10 according to an example embodiment of the present disclosure will be described.

Figure 20:
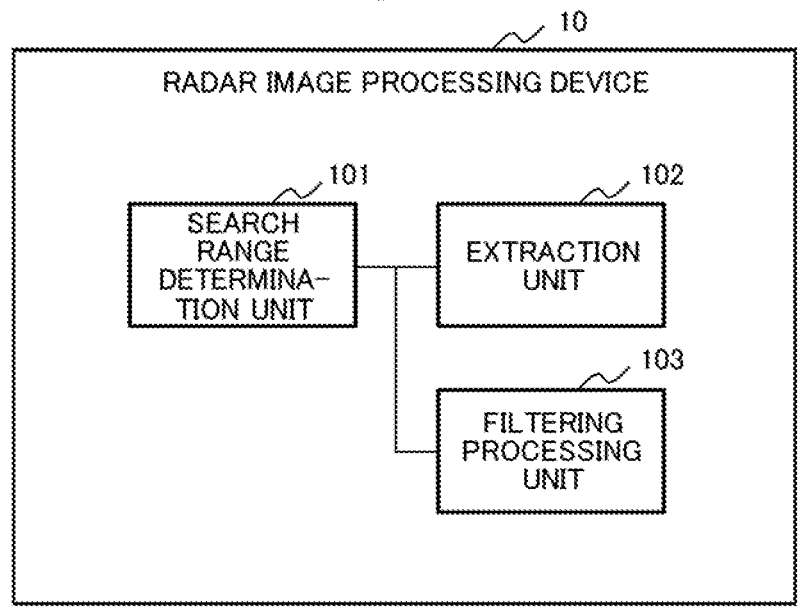
FIG. 20 is a block diagram illustrating a configuration of a radar image processing device according to a second example embodiment of the present disclosure.

FIG. 20 is a block diagram illustrating a configuration of the radar image processing device 10. The radar image processing device 10 includes a search range determination unit 101, an extraction unit 102, and a filtering processing unit 103.

The extraction unit 102 extracts a similar block similar to a reference block set as an area of interest in a radar image generated from data obtained by an imaging radar. The extraction unit 102 extracts, by searching a search range determined by the search range determination unit 101, the similar block existing in the search range. The similar block extraction unit 114 of each of the above-described example embodiments corresponds to an example of the extraction unit 102.

The search range determination unit 101 determines a search range that is a range in which the extraction unit 102 searches for a similar block. The search range determination unit 101 determines the search range on the basis of a reference block and the layover direction that is the direction in which layover occurs in a radar image. The layover direction can be estimated from the incident direction of an electromagnetic wave used for observation by the imaging radar. The search range determination unit 113 of each of the above-described example embodiments corresponds to an example of the search range determination unit 101.

The filtering processing unit 103 performs filtering processing for reducing speckles generated in a radar image by using a reference block and a similar block extracted by the extraction unit 102. The filtering processing unit 115 of each of the above-described example embodiments corresponds to an example of the filtering processing unit 103.

Figure 21:
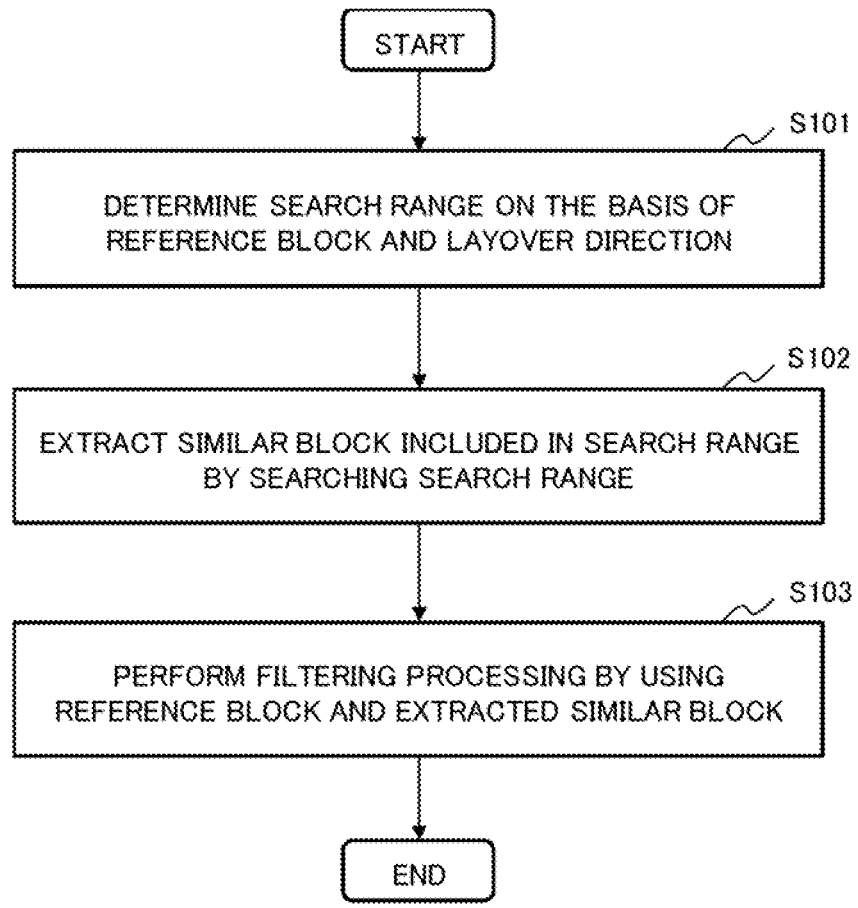
FIG. 21 is a flowchart illustrating a flow of a radar image processing method according to the second example embodiment of the present disclosure.

An example of a flow of processing performed by the radar image processing device 10 will be described with reference to FIG. 21. First, the search range determination unit 101 determines a search range on the basis of a reference block and the layover direction (Step S101). Next, the extraction unit 102 extracts a similar block included in the determined search range by searching the search range (Step S102). Then, the filtering processing unit 103 performs filtering processing by using the reference block and the extracted similar block (Step S103).

With the radar image processing device 10, a similar block is efficiently extracted, and performance of speckle reduction processing is improved or a calculation cost is reduced. The reason is that the search range determination unit 101 determines a search range on the basis of the layover direction, so that the extraction unit 102 can search a range in which a similar block is more easily found.

Hardware Configuration Implementing Components of Example Embodiments

In the example embodiments of the present disclosure described above, blocks indicating components of each device are indicated in functional units. However, the blocks indicating the components do not necessarily imply that each component is configured by a separate module.

The processing performed by each component may be implemented, for example, by a computer system reading and executing a program that is stored on a computer-readable storage medium and causes the computer system to perform the processing. Examples of a "computer-readable storage medium" include a portable medium such as an optical disk, a magnetic disk, a magneto-optical disk, and a nonvolatile semiconductor memory, and a storage device such as a read only memory (ROM) and a hard disk incorporated in the computer system. The "computer-readable storage medium" includes those that can temporarily hold the program, such as a volatile memory within the computer system, and those that transmit the program, such as a communication line, for example, a network or a telephone line. The above-described program may be a program for implementing a part of the above-described functions, and may be a program that can implement the above-described functions in combination with a program already stored in the computer system.

Figure 22:
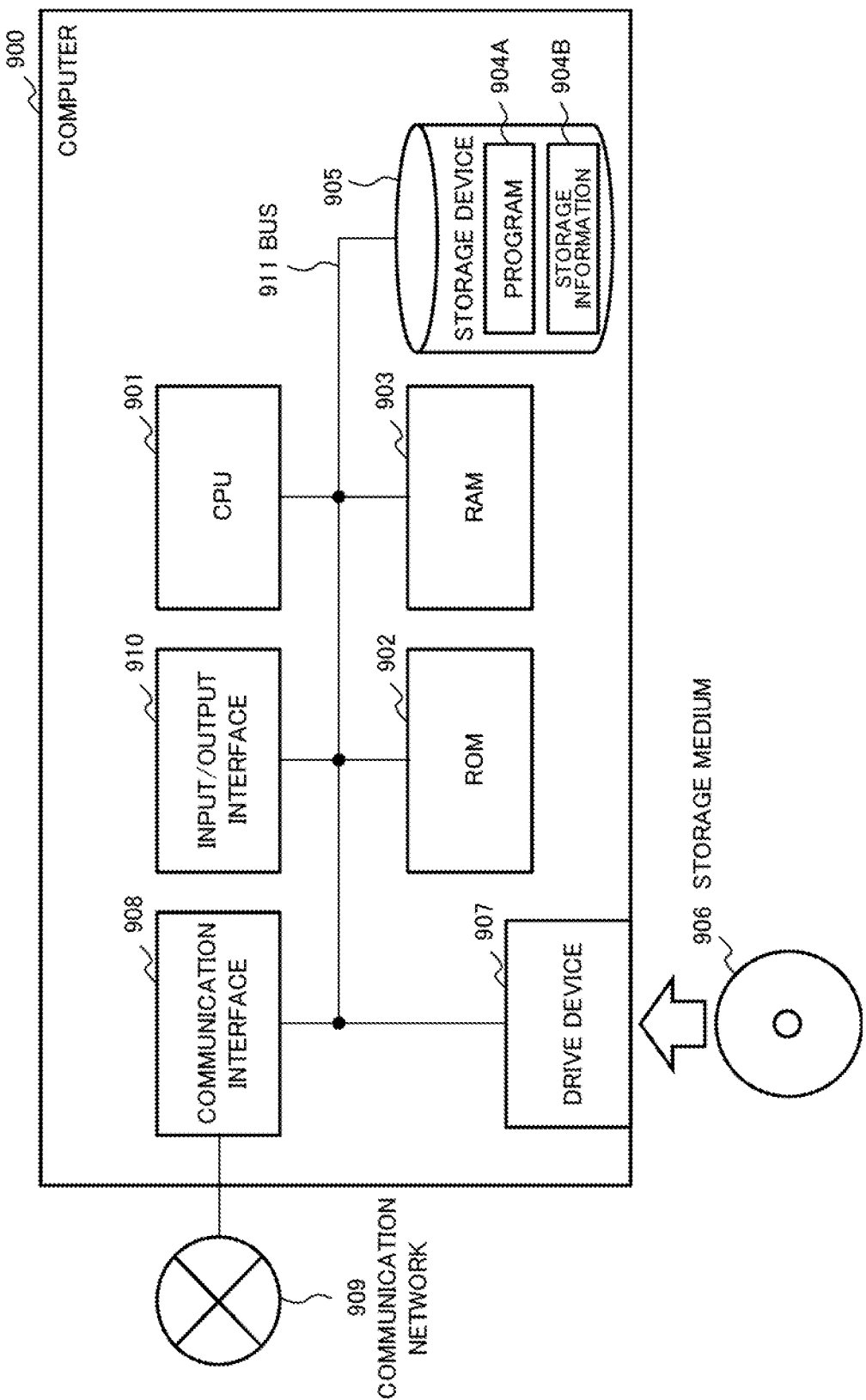
FIG. 22 is a block diagram illustrating an example of hardware constituting each unit of each example embodiment of the present disclosure.

The "computer system" is, as an example, a system including a computer 900 as illustrated in FIG. 22. The computer 900 includes the following configurations.

one or more central processing units (CPU) 901
    a ROM 902
    a random access memory (RAM) 903
    a program 904A and storage information 904B loaded into the RAM 903
    a storage device 905 that stores the program 904A and the storage information 904B
    a drive device 907 that performs reading/writing of a storage medium 906
    a communication interface 908 connected to a communication network 909
    an input/output interface 910 that inputs/outputs data
    a bus 911 that connects the components For example, each component of each device in each example embodiment is implemented by the CPU 901 loading the program 904A that implements a function of the component in the RAM 903 and executing the program 904A. The program 904A that implements a function of each component of each device is stored in the storage device 905 or the ROM 902 in advance, for example. Then, the CPU 901 reads the program 904A as necessary. The storage device 905 is a hard disk, for example. The program 904A may be supplied to the CPU 901 via the communication network 909, or may be stored in advance in the storage medium 906, read by the drive device 907, and supplied to the CPU 901. The storage medium 906 is a portable medium such as an optical disk, a magnetic disk, a magneto-optical disk, and a nonvolatile semiconductor memory, for example.

There are various modifications in a method for implementing each device. For example, each device may be implemented by a possible combination of a different computer 900 and a different program for each component. A plurality of components included in each device may be implemented by a possible combination of a single computer 900 and a program.

A part or all of components of each device may be implemented by another general-purpose or dedicated circuit, a computer, and the like, or a combination thereof. These may include a single chip or a plurality of chips connected via a bus.

When a part or all of components of each device are implemented by a plurality of computers, circuits, and the like, the plurality of computers, circuits, and the like may be arranged in a centralized manner or in a distributed manner. For example, the computers, the circuits, and the like may be implemented in a form in which each is connected via a communication network, such as a client and server system or a cloud computing system.

A part or all of the above-described example embodiments may also be described as the following Supplementary Notes, but are not limited thereto.

<<Supplementary Note>>

[Supplementary Note 1]

A radar image processing device including:

search range determination means for determining a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar;

extraction means for extracting a similar block that is similar to the reference block and included in the search range by searching the search range; and filtering processing means for performing filtering processing for reducing speckles generated in the radar image by using the reference block and the extracted similar block.

[Supplementary Note 2]

The radar image processing device according to Supplementary Note 1, wherein the search range determination means determines, as the search range, a range defined by a figure having a length in the layover direction longer than a length in a direction perpendicular to the layover direction.

[Supplementary Note 3]

The radar image processing device according to Supplementary Note 1 or 2, further including determination means for determining whether the reference block overlaps an area where layover occurs in the radar image, wherein the search range determination means determines a search range based on the layover direction when the reference block overlaps the area where layover occurs, and determines a search range by another determination method when the reference block does not overlap the area where layover occurs.

[Supplementary Note 4]

The radar image processing device according to Supplementary Note 3, further including range estimation means for estimating a range in the layover direction of a first layover area, the first layover area being an area of layover originating from a single structure and including overlap with the reference block, wherein the search range determination means determines the search range based on the range in the layover direction of the first layover area.

[Supplementary Note 5]

The radar image processing device according to Supplementary Note 4, further including second area estimation means for estimating a second layover area based on information representing a three-dimensional position and shape and a type of a structure imaged on the radar image, the second layover area being an area of the layover originating from another structure of the same type as the single structure in the radar image, wherein the search range determination means determines, as a part of the search range, an area including at least a part of the second layover area.

[Supplementary Note 6]

The radar image processing device according to Supplementary Note 5, wherein when a similar block is extracted in the second layover area by the extraction means, the search range determination means redetermines the search range in the second layover area based on a position of the similar block and the layover direction.

[Supplementary Note 7]

The radar image processing device according to any one of Supplementary Notes 4 to 6, wherein when the search range determination means determines a search range for a similar block similar to a second reference block different from the reference block and the second reference block overlaps the first layover area, the search range determination means determines a search range by using information regarding a search range determined as a search range for a similar block similar to the reference block.

[Supplementary Note 8]

A radar image processing method including:

determining a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar;

extracting a similar block that is similar to the reference block and included in the search range by searching the search range; and performing filtering processing for reducing speckles generated in the radar image by using the reference block and the extracted similar block.

[Supplementary Note 9]

The radar image processing method according to Supplementary Note 8, wherein a range defined by a figure having a length in the layover direction longer than a length in a direction perpendicular to the layover direction is determined as the search range.

[Supplementary Note 10]

The radar image processing method according to Supplementary Note 8 or 9, further including determining whether the reference block overlaps an area where layover occurs in the radar image, wherein a search range is determined based on the layover direction when the reference block overlaps the area where layover occurs, and a search range is determined by another determination method when the reference block does not overlap the area where layover occurs.

[Supplementary Note 11]

The radar image processing method according to Supplementary Note 10, further including estimating a range in the layover direction of a first layover area, the first layover area being an area of layover originating from a single structure and including overlap with the reference block, wherein the search range is determined based on the range in the layover direction of the first layover area.

[Supplementary Note 12]

The radar image processing method according to Supplementary Note 11, further including estimating a second layover area based on information representing a three-dimensional position and shape, and a type of a structure imaged on the radar image, the second layover area being an area of the layover originating from another structure of the same type as the single structure in the radar image, wherein an area including at least a part of the second layover area is determined as a part of the search range.

[Supplementary Note 13]

The radar image processing method according to Supplementary Note 12, wherein when a similar block is extracted in the second layover area, the search range in the second layover area is redetermined based on a position of the similar block and the layover direction.

[Supplementary Note 14]

The radar image processing method according to any one of Supplementary Notes 11 to 13, wherein when a search range for a similar block similar to a second reference block different from the reference block is determined and the second reference block overlaps the first layover area, a search range is determined by using information regarding a search range determined as a search range for a similar block similar to the reference block.

[Supplementary Note 15]

A computer readable storage medium storing a program for causing a computer to execute:

search range determination processing for determining a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar;

extraction processing for extracting a similar block that is similar to the reference block and included in the search range by searching the search range; and filtering processing for reducing speckles generated in the radar image by using the reference block and the extracted similar block.

[Supplementary Note 16]

The storage medium according to Supplementary Note 15, wherein in the search range determination processing, a range defined by a figure having a length in the layover direction longer than a length in a direction perpendicular to the layover direction is determined as the search range.

[Supplementary Note 17]

The storage medium according to Supplementary Note 15 or 16, wherein the program further causes the computer to execute determination processing for determining whether the reference block overlaps an area where layover occurs in the radar image, and in the search range determination processing, a search range is determined based on the layover direction when the reference block overlaps the area where layover occurs, and a search range is determined by another determination method when the reference block does not overlap the area where layover occurs.

[Supplementary Note 18]

The storage medium according to Supplementary Note 17, wherein the program further causes the computer to execute range estimation processing for estimating a range in the layover direction of a first layover area, the first layover area being an area of layover originating from a single structure and including overlap with the reference block, and in the search range determination processing, the search range is determined based on the range in the layover direction of the first layover area.

[Supplementary Note 19]

The storage medium according to Supplementary Note 18, wherein the program further causes the computer to execute second area estimation processing for estimating a second layover area based on information representing a three-dimensional position and shape, and a type of a structure imaged on the radar image, the second layover area being an area of the layover originating from another structure of the same type as the single structure in the radar image, and in the search range determination processing, an area including at least a part of the second layover area is determined as a part of the search range.

[Supplementary Note 20]

The storage medium according to Supplementary Note 19, wherein in the search range determination processing, when a similar block is extracted in the second layover area by the extraction processing, the search range in the second layover area is redetermined based on a position of the similar block and the layover direction.

[Supplementary Note 21]

The storage medium according to any one of Supplementary Notes 18 to 20, wherein in the search range determination processing, when a search range for a similar block similar to a second reference block different from the reference block is determined and the second reference block overlaps the first layover area, a search range is determined by using information regarding a search range determined as a search range for a similar block similar to the reference block.

The present invention is not limited to the example embodiments described above. Various changes that can be understood by those skilled in the art can be made to the configurations and details of the example embodiments described above within the scope of the present invention.

This application is based upon and claims the benefit of priority from Japanese patent application No. 2018-057972 filed on Mar. 26, 2018, the disclosure of which is incorporated herein in its entirety by reference.

REFERENCE SIGNS LIST 10 to 13 radar image processing device
101 search range determination unit
102 extraction unit
103 filtering processing unit
110 data acquisition unit
111 reference block setting unit
112 direction estimation unit
113 search range determination unit
114 similar block extraction unit
115 filtering processing unit
116 output unit
117 determination unit
118 range estimation unit
119 map generation unit
120 second area estimation unit
900 computer
901 CPU
902 ROM
903 RAM
904A program
904B storage information
905 storage device
906 storage medium
907 drive device
908 communication interface
909 communication network
910 input/output interface
911 bus

The invention claimed is:

1. A radar image processing device comprising:
at least one memory configured to store instructions; and
at least one processor configured to execute the instructions to:
determine a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar;

extract a similar block that is similar to the reference block and included in the search range by searching the search range; and perform filtering processing for reducing speckles generated in the radar image by using the reference block and the extracted similar block, wherein a range defined by a figure having a length in the layover direction longer than a length in a direction perpendicular to the layover direction is determined as the search range.

2. The radar image processing device according to claim 1, wherein the at least one processor is further configured to execute the instructions to determine whether the reference block overlaps an area where layover occurs in the radar image, wherein a search range is determined based on the layover direction when the reference block overlaps the area where layover occurs, and a search range is determined by another determination method when the reference block does not overlap the area where layover occurs.

3. The radar image processing device according to claim 2, wherein the at least one processor is further configured to execute the instructions to estimate a range in the layover direction of a first layover area, the first layover area being an area of layover originating from a single structure and including overlap with the reference block, wherein the search range is determined based on the range in the layover direction of the first layover area.

4. The radar image processing device according to claim 3, wherein the at least one processor is further configured to execute the instructions to estimate a second layover area based on information representing a three-dimensional position and shape and a type of a structure imaged on the radar image, the second layover area being an area of the layover originating from another structure of the same type as the single structure in the radar image, wherein an area including at least a part of the second layover area is determined as a part of the search range.

5. The radar image processing device according to claim 4, wherein when a similar block is extracted in the second layover area the search range in the second layover area is redetermined based on a position of the similar block and the layover direction.

6. The radar image processing device according to claim 3, wherein when a search range for a similar block similar to a second reference block different from the reference block is determined and the second reference block overlaps the first layover area, a search range is determined by using information regarding a search range determined as a search range for a similar block similar to the reference block.

7. A radar image processing method comprising:

determining a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar;

extracting a similar block that is similar to the reference block and included in the search range by searching the search range; and performing filtering processing for reducing speckles generated in the radar image by using the reference block and the extracted similar block, wherein a range defined by a figure having a length in the layover direction longer than a length in a direction perpendicular to the layover direction is determined as the search range.

8. The radar image processing method according to claim 7, further comprising determining whether the reference block overlaps an area where layover occurs in the radar image, wherein a search range is determined based on the layover direction when the reference block overlaps the area where layover occurs, and a search range is determined by another determination method when the reference block does not overlap the area where layover occurs.

9. The radar image processing method according to claim 8, further comprising estimating a range in the layover direction of a first layover area, the first layover area being an area of layover originating from a single structure and including overlap with the reference block, wherein the search range is determined based on the range in the layover direction of the first layover area.

10. The radar image processing method according to claim 9, further comprising estimating a second layover area based on information representing a three-dimensional position and shape and a type of a structure imaged on the radar image, the second layover area being an area of the layover originating from another structure of the same type as the single structure in the radar image, wherein an area including at least a part of the second layover area is determined as a part of the search range.

11. The radar image processing method according to claim 10, wherein when a similar block is extracted in the second layover area, the search range in the second layover area is redetermined based on a position of the similar block and the layover direction.

12. The radar image processing method according to claim 9, wherein when a search range for a similar block similar to a second reference block different from the reference block is determined and the second reference block overlaps the first layover area, a search range is determined by using information regarding a search range determined as a search range for a similar block similar to the reference block.

13. A non-transitory computer readable storage medium storing a program for causing a computer to execute:

search range determination processing for determining a search range based on a reference block and a layover direction, the reference block being set as an area of interest in a radar image generated from data obtained by an imaging radar, the layover direction being a direction in which layover occurs in the radar image and being estimated from an incident direction of an electromagnetic wave used for observation by the imaging radar;

extraction processing for extracting a similar block that is similar to the reference block and included in the search range by searching the search range; and filtering processing for reducing speckles generated in the radar image by using the reference block and the extracted similar block, wherein in the search range determination processing, a range defined by a figure having a length in the layover direction longer than a length in a direction perpendicular to the layover direction is determined as the search range.

14. The storage medium according to claim 13, wherein the program further causes the computer to execute determination processing for determining whether the reference block overlaps an area where layover occurs in the radar image, and in the search range determination processing, a search range is determined based on the layover direction when the reference block overlaps the area where layover occurs, and a search range is determined by another determination method when the reference block does not overlap the area where layover occurs.

15. The storage medium according to claim 14, wherein the program further causes the computer to execute range estimation processing for estimating a range in the layover direction of a first layover area, the first layover area being an area of layover originating from a single structure and including overlap with the reference block, and in the search range determination processing, the search range is determined based on the range in the layover direction of the first layover area.

16. The storage medium according to claim 15, wherein the program further causes the computer to execute second area estimation processing for estimating a second layover area based on information representing a three-dimensional position and shape and a type of a structure imaged on the radar image, the second layover area being an area of the layover originating from another structure of the same type as the single structure in the radar image, and in the search range determination processing, an area including at least a part of the second layover area is determined as a part of the search range.

17. The storage medium according to claim 16, wherein in the search range determination processing, when a similar block is extracted in the second layover area by the extraction processing, the search range in the second layover area is redetermined based on a position of the similar block and the layover direction.

\* \* \* \* \*